(12) United States Patent
Quiquempoix et al.

(10) Patent No.: US 11,386,025 B2
(45) Date of Patent: Jul. 12, 2022

(54) DAISY CHAIN COMPLEX COMMANDS

(71) Applicant: Microchip Technology Incorporated, Chandler, AZ (US)

(72) Inventors: Vincent Quiquempoix, Divonne-les-Bains (FR); Yann Johner, Preverenges (CH)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/998,170

(22) Filed: Aug. 20, 2020

(65) Prior Publication Data
US 2021/0064555 A1 Mar. 4, 2021

Related U.S. Application Data

(60) Provisional application No. 62/893,216, filed on Aug. 29, 2019, provisional application No. 62/893,202, (Continued)

(51) Int. Cl.
*G06F 13/20* (2006.01)
*G06F 13/40* (2006.01)
*G06F 13/42* (2006.01)

(52) U.S. Cl.
CPC .......... *G06F 13/20* (2013.01); *G06F 13/4068* (2013.01); *G06F 13/4247* (2013.01); (Continued)

(58) Field of Classification Search
CPC .. G06F 13/20; G06F 13/4256; G06F 13/4291; G06F 13/4068; G06F 13/4247; G06F 13/4282
(Continued)

(56) References Cited

U.S. PATENT DOCUMENTS 4,914,574 A * 4/1990 Terada .................. G06F 15/161
710/1
5,132,635 A 7/1992 Kennedy .................. 324/756.05
(Continued)

FOREIGN PATENT DOCUMENTS

WO 2007/109887 A1 10/2007 ............. G06F 13/38

OTHER PUBLICATIONS

Written Opinion of the International Searching Authority for PCT/US2020/048321 (dated Mar. 4, 2021). (Year: 2021).*
(Continued)

*Primary Examiner* — Farley Abad
*Assistant Examiner* — Henry W Yu
(74) *Attorney, Agent, or Firm* — Slayden Grubert Beard PLLC

(57) ABSTRACT

An apparatus may include a serial data output port configured to send output data to a electronic device. The apparatus may include a serial data input port configured to receive input data from another electronic device. The apparatus may include a chip select output port configured to send output to the electronic devices connected in a daisy chain. The apparatus may include a interface circuit, configured to determine that a given electronic device is to selectively execute a first command. The interface circuit may be further configured to issue a complex command to the electronic devices connected. The complex command may indicate to the f electronic devices that additional commands are to be selectively executed.

19 Claims, 10 Drawing Sheets

Related U.S. Application Data filed on Aug. 29, 2019, provisional application No. 62/893,209, filed on Aug. 29, 2019.

(52) U.S. Cl.
CPC ...... *G06F 13/4256* (2013.01); *G06F 13/4282* (2013.01); *G06F 13/4291* (2013.01)

(58) Field of Classification Search
USPC .............. 710/2, 3, 5, 14, 33, 37, 38, 62, 110
See application file for complete search history.

(56) References Cited

U.S. PATENT DOCUMENTS

| | | | |
|---|---|---|---|
| 8,384,427 B1* | 2/2013 | Tang | H03K 19/1776 326/38 |
| 10,216,678 B2 | 2/2019 | Murtaza et al. | |
| 2003/0074505 A1* | 4/2003 | Andreas | G06F 13/4256 710/110 |
| 2003/0123473 A1* | 7/2003 | Satoh | G06F 13/372 370/442 |
| 2007/0076502 A1 | 4/2007 | Pyeon et al. | 365/221 |
| 2007/0233903 A1 | 10/2007 | Pyeon | 710/1 |
| 2008/0028158 A1* | 1/2008 | Bartley | G06F 13/4243 711/154 |
| 2008/0123635 A1* | 5/2008 | Mortensen | H04Q 11/04 370/360 |
| 2010/0280786 A1* | 11/2010 | Gorbold | G06F 12/0661 702/120 |
| 2011/0252162 A1* | 10/2011 | Li | G06F 13/1684 710/3 |
| 2012/0072628 A1* | 3/2012 | Crockett | G06F 13/4291 710/110 |
| 2012/0166695 A1* | 6/2012 | Venus | G06F 13/4256 710/110 |
| 2013/0297829 A1 | 11/2013 | Berenbaum et al. | 710/3 |
| 2015/0134802 A1* | 5/2015 | Van Den Wouwer | H04L 61/2038 709/223 |
| 2016/0098371 A1 | 4/2016 | Murtaza et al. | 710/110 |
| 2016/0205066 A1* | 7/2016 | Attarwala | H04L 69/40 709/208 |
| 2016/0328353 A1* | 11/2016 | Rivers | G06F 13/4247 |
| 2018/0276157 A1 | 9/2018 | Lofamia et al. | |

OTHER PUBLICATIONS

International Search Report and Written Opinion, Application No. PCT/US2020/048330, 15 pages, dated Nov. 9, 2020.
International Search Report and Written Opinion, Application No. PCT/US2020/048321, 15 pages, dated Nov. 11, 2020.
International Search Report and Written Opinion, Application No. PCT/US2020/048338, 15 pages, dated Nov. 17, 2020.
U.S. Non-Final Office Action, U.S. Appl. No. 16/998,097, 25 pages, dated Feb. 9, 2021.
U.S. Non-Final Office Action, U.S. Appl. No. 16/998,097, 23 pages, dated Sep. 17, 2021.
U.S. Non-Final Office Action, U.S. Appl. No. 16/998,050, 18 pages, dated May 26, 2021.
U.S. Final Office Action, U.S. Appl. No. 16/998,097, 24 pages, dated Apr. 1, 2022.

* cited by examiner

DAISY CHAIN COMPLEX COMMANDS

PRIORITY

The present disclosure claims priority to U.S. Provisional Patent Application No. 62/893,216, filed Aug. 29, 2019, to U.S. Provisional Patent Application No. 62/893,202 filed Aug. 29, 2019, and to U.S. Provisional Patent Application No. 62/893,209 filed Aug. 29, 2019, the contents of which are hereby incorporated in their entirety.

FIELD OF THE INVENTION

The present disclosure relates to communication between microcontrollers and, more particularly, to a complex commands for daisy chain mode operations.

BACKGROUND

Microcontroller units (MCUs) and other electronic devices communicate in a variety of ways. One such way is a daisy chain mode, wherein such devices are connected one after the other to each other, and data is propagated from one device to the next device. Daisy chain configurations are often used for large backplane applications and may reduce the number of wires needed, compared to configurations wherein data transfer is in parallel between such devices. A daisy chain configuration uses n ports, wherein n is the number of bits of data to be communicated between any two devices. In the case of serial communication, such as serial peripheral interface (SPI), n may be one. In contrast, wherein a parallel configuration may require m ports, or m times n ports, wherein m is the number of devices that will communicate data to each other. If the number of ports on the device is limited, a daisy chain configuration may help conserve the usage of ports.

Inventors of embodiments of the present disclosure have discovered that traditional commands or instructions are not easily addressed to individual nodes or electronic devices in a daisy chain. This situation may arise, for example, when a command or instruction is meant to be executed by a single electronic device or subset of electronic devices in the daisy chain, or when different commands or instructions are meant to be sent to different nodes of the daisy chain. Inventors of embodiments of the present disclosure have considered possible solutions for implementing commands or instructions to address individual nodes in the daisy chain, such as selectively using the chip select signal. However, inventors of embodiments of the present disclosure have discovered that such commands, when transmitted, are implemented by a lengthy process. A command specific to the nth electronic device in a daisy chain may be sent first, and the command propagated through the daisy chain so that after n delays for n devices, then the command can be executed by the nth electronic device. Subsequently, a command specific to the (n−1)th electronic device in the daisy chain may be sent through the daisy chain and the chip select signal asserted after it reaches the (n−1)th electronic device. Thus, the nth device will not execute this command. However, all devices before the (n−1)th electronic device will have to propagate this command and also execute it. The command would be propagated through the daisy chain so that after (n−1) delays for (n−1) electronic devices, then the command can be executed by the (n−1)th electronic device. To send an individual command to all electronic devices in the daisy chain, (n*(n+1)/2) delays may be required. Moreover, a given electronic device may have to execute commands for later electronic devices in the daisy chain that the given device does not truly need to execute.

Inventors of embodiments of the present disclosure have discovered the need for specific commands in the daisy chain to be executed synchronously. Moreover, inventors of embodiments of the present disclosure have identified mechanisms to achieve synchronous execution of disparate commands despite a command propagation through the chain that inherently induces delays.

Inventors of embodiments of the present disclosure have discovered how to address one or more of these limitations of using traditional commands by developing complex commands for use in a network of devices connected by a daisy chain configuration.

SUMMARY

Embodiments of the present disclosure include an apparatus. The apparatus may include a serial data input port. The serial data input port may be configured to receive input from a first electronic device in a daisy chain of electronic devices. The apparatus may include a serial data output port configured to send output to a second electronic device in the daisy chain of electronic devices. The apparatus may include a chip select input port configured to receive input from a third electronic device. The third electronic device may be a master control unit. The apparatus may include an interface circuit, configured to, in a daisy chain mode and based on a first received command, receive information on the serial data input port and determine whether the information includes a second received command to be selectively executed by the apparatus. The interface circuit may be configured to, based on a determination that the information includes a second received command is to be selectively executed by the apparatus, execute the second received command.

Embodiments of the present disclosure include an apparatus. The apparatus may be a master control unit. The apparatus may include a serial data output port configured to send output data to a first electronic device. The apparatus may include a serial data input port configured to receive input data from a second electronic device. The apparatus may include a chip select output port configured to send output to a plurality of electronic devices, the plurality of electronic devices connected in a daisy chain and including the first and second electronic device. The apparatus may include an interface circuit, configured to determine that a given electronic device in the plurality of electronic devices connected in a daisy chain is to selectively execute a first command. The interface circuit may be further configured to, based on a determination that the given electronic device is to execute the first command, issue a complex command to the plurality of electronic devices connected in a daisy chain through the serial data output port. The complex command may indicate to the plurality of electronic devices that additional commands are to be selectively executed.

Embodiments of the present disclosure may include a method. The method may include, through a serial data input port, receiving input from a first electronic device in a daisy chain of electronic devices. The method may include, through a serial data output port, sending output to a second electronic device in the daisy chain of electronic devices. The method may include, through a chip select input port, receiving input from a third electronic device. The method may include, in a daisy chain mode and based on a first received command, receiving information on the serial data input port, determining whether the information includes a second received command to be selectively executed by the apparatus, and, based on a determination that the information includes a second received command is to be selectively executed by the apparatus, executing the second received command.

Embodiments of the present disclosure may include a method. The method may include sending output data to a first electronic device through a serial data output port. The method may include receiving input data from a second electronic device through a serial data input port. The method may include, through a chip select output port, sending output to a plurality of electronic devices. The plurality of electronic devices may be connected in a daisy chain and include the first and second electronic devices. The method may include determining that a given electronic device in the plurality of electronic devices connected in a daisy chain is to selectively execute a first command. The method may include, based on a determination that the given electronic device is to execute the first command, issuing a complex command to the plurality of electronic devices connected in a daisy chain through the serial data output port. The method may include, with the complex command, indicating to the plurality of electronic devices that additional commands are to be selectively executed.

DETAILED DESCRIPTION

Figure 1:
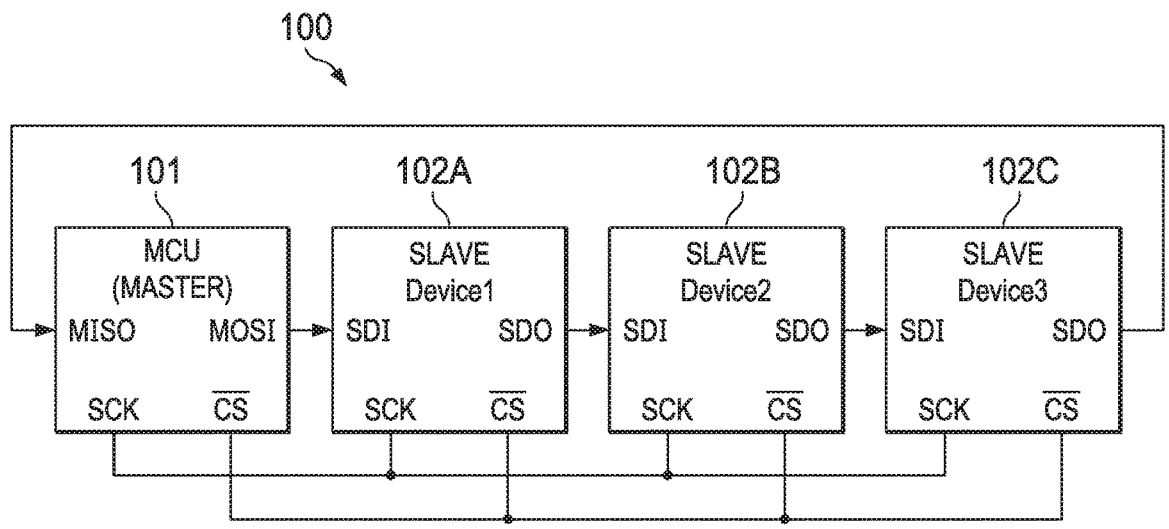
FIG. 1 is an illustration of a system with daisy chained electronic devices, according to embodiments of the present disclosure.

Embodiments of the present disclosure may include a system. The system may include electronic devices connected to one another in a daisy chain fashion. The electronic devices may include a master electronic device or master control unit and any suitable number of other electronic devices. The electronic devices and master control units may be implemented in the same manner or in a different manner. The electronic devices and master control units may each include interface circuits. The interface circuits may be implemented in any suitable combination of analog circuitry, digital circuitry, or instructions for execution by a processor. The interface circuits may handle communication between electronic devices and master control units. A master control unit may be connected to each electronic device in any suitable manner. For example, the master control unit may be connected to each electronic device via a clock signal connection. The master control unit may be connected to each electronic device via a chip select signal connection. The master control unit may be connected to a first electronic device in the daisy chain through a serial data output port of the master control unit and a serial data input port of the first electronic device. A given electronic device of the daisy chain may be connected to another electronic device of the daisy chain through a serial data output port of the given electronic device and a serial data input port of the other electronic device. The master control unit may be connected to a last electronic device in the daisy chain through a serial data input port in the master control unit and a serial data output port in the electronic device.

In combination with any of the above embodiments, the master control unit may be configured to issue commands and data associated with the commands to the electronic devices. When in daisy chain mode, the electronic devices may generally propagate information received on its serial data input port to its serial data output port. In combination with any of the above embodiments, one such command may be a complex command, which may denote to the recipient electronic devices that additional commands are to follow that may be selectively executed by particular ones of the electronic devices. In combination with any of the above embodiments, the selective execution may include execution by one or more electronic devices but no execution by one or more other electronic devices.

In combination with any of the above embodiments, the interface circuit of a given electronic device may be configured to, in a daisy chain mode and based on a first received command such as complex command, receive information on its serial data input port. The interface circuit may be configured to determine whether the information includes another received command to be selectively executed by the electronic device. The interface circuit may be configured to, based on a determination that the information includes another received command is to be selectively executed by the electronic device, execute the electronic device. In combination with any of the above embodiments, the interface circuit may be further configured to, based on a determination that the information includes another command that is not to be selectively executed by the apparatus, copying the other command to the serial data output port without executing the other command. In combination with any of the above embodiments, the interface circuit may be further configured to determine whether the information includes the other received command to be selectively executed by the apparatus based at least in part upon a position of the electronic devices in the daisy chain of electronic devices. In combination with any of the above embodiments, the interface circuit may be further configured to determine whether the information includes another such command based on whether the other such command is received in an order corresponding to a position of the electronic device in the daisy chain of electronic devices. In combination with any of the above embodiments, the interface circuit may be further configured to copy the other received command to the serial data output port after executing the other received command. In combination with any of the above embodiments, the interface circuit may be further configured to receive a changed edge on the chip select input port in conjunction with the first received command, such as before the first received command. A determination of whether to look for additional commands after the first received command, the additional commands targeting specific ones of the electronic devices, may be based in part on the first received command and the changed edge on the chip select input port. In combination with any of the above embodiments, the interface circuit may be further configured to execute the other received command upon a changed edge on the chip select input port subsequent to receiving the other received command. In combination with any of the above embodiments, the interface circuit may be further configured to copy other information to the serial data output port, the other information received before the information including the other received command. In combination with any of the above embodiments, the interface circuit may be further configured to determine that the other is a read command, execute the read command to generate read data, and substitute portions of the information with the read data and copy results from the substitution to the serial data output port.

The interface circuit of a master control unit may be configured to determine that a given electronic device in the plurality of electronic devices connected in a daisy chain is to selectively execute a first command. The interface circuit of a given electronic device may be configured to, based on a determination that the given electronic device is to execute the first command, issue a complex command to the plurality of electronic devices connected in a daisy chain through the serial data output port. The interface circuit of a given electronic device may be configured to, with the complex command, indicate to the plurality of electronic devices that additional commands are to be selectively executed. The interface circuit of a given electronic device may be configured to, subsequent to issuing the complex command, issue the first command to the plurality of electronic devices connected in a daisy chain through the serial data output port, the first command to be selectively executed by the given electronic device and not executed by one or more other electronic devices in the daisy chain. The interface circuit of a given electronic device may be configured to issue additional information before or after the first command such that a position of the first command among such additional information corresponds to a position of the given electronic device in the daisy chain. A position of the additional information before or after the first command may correspond to other electronic devices in the daisy chain. The additional information before or after the first command may include second commands for other electronic devices in the daisy chain or NOPs. The interface circuit of a given electronic device may be configured to a quantity of NOPs immediately after the first command, wherein the first command is a read operation and the quantity is sufficient for the given electronic device to write data yielded from executing the read operation. The interface circuit of a given electronic device may be configured to issue a second command to the plurality of electronic devices connected in a daisy chain through the serial data output port. The second command may be a write operation to be executed by the second electronic device.

Embodiments of the present disclosure may include methods performed by any of the portions of the systems above. Moreover, embodiments of the present disclosure may include instructions in one or more machine-readable non-transitory media. The media may be in an article of manufacture. The instructions may be executable by a processor. The instructions, when loaded and executed by the processor, may cause the configurations described above to be performed.

FIG. 1 is an illustration of a system 100 with daisy chained electronic devices, according to embodiments of the present disclosure. Any suitable electronic devices may be daisy chained. For example, a microcontroller unit (MCU) 101 may be a master or head node in system 100. In another example, additional electronic devices 102A, 102B, 102C may be slave or sub nodes in system 100. Any suitable number and type of electronic devices may be used. For example, in some implementations, 256 different electronic devices may be daisy chained in system 100. The electronic devices of system 100, such as MCU 101 and electronic devices 102, may be implemented in a same manner or each in a different manner.

System 100 may be implemented within any suitable context. For example, system 100 may be implemented within a data sensor array, vehicle, control system, industrial automation, home automation, factory, test and validation system, or any other suitable application. System 100 may be configured to read or write data via daisy chained serial interfaces in order to accomplish or further any suitable task in such contexts.

MCU 101 may include inputs and outputs, including master in slave output (MISO), configured to receive data from an end of the daisy chain of system 100, such as output of electronic device 102C. MISO may be received through a MISO port. The MISO port may be a serial data input port configured to receive input from other electronic devices in the daisy chain, such as a last electronic device 102 in the daisy chain. MCU 101 may include an output for master output slave input (MOSI). MOSI may be sent through a MOSI port. The MOSI port may be a serial data output port configured to send output to other electronic devices in the daisy chain. For example, MCU 101 which may be configured to send data to a first slave electronic device of the daisy chain of system 100, such as input to electronic device 102A, through the MOSI port. MCU 101 may include a port or pin(s) for a shared clock (SCK), which may be used as a shared clock output port to send a shared clock signal for timing of transfers. MCU 101 may be configured to generate SCK, and it may be routed to each of the other electronic devices 102. MCU 101 may include a port or pin(s) for a chip select (CS) signal, which may be used to communicate various information as discussed below. The CS port may be a chip select output port configured to send input from a master device such as MCU 101 to electronic devices 102. MCU 101 may be configured to generate the CS signal, and it may be routed to each of the other electronic devices 102. The CS signal may be manifested or evaluated in terms of an inverted or logical negative version of the CS signal, denoted as nCS. Any of MCU 101 or electronic devices 102 may be configured to generate a CS/nCS signal, and the CS/nCS signal may be routed to each of the other electronic devices 102 and MCU 101.

Electronic devices 102 may each include a serial data input (SDI) port or pin(s) configured to receive data input from MCU 101 or another one of electronic devices 102. The SDI port may be a serial data input port configured to receive input from other electronic devices in the daisy chain. Electronic devices 102 may each include a serial data output (SDO) port or pin(s) configured to send data output to MCU 101 or another one of electronic devices 102. The SDO port may be a serial data output port configured to send output to other electronic devices in the daisy chain. Electronic devices 102 may include a shared clock input port to receive an SCK signal and a chip select input port to receive CS or nCS signals. Electronic devices 102 and MCU 101 may further include other suitable number and kind of ports.

MCU 101 and electronic devices 102 may use any suitable communication protocol, such as SPI. MCU 101 may be configured to issue commands or data to electronic devices 102. Such commands may be issued serially through the MOSI port of MCU 101 to the SDI port of electronic device 102A, which may in turn serially propagate the command or data on to other electronic devices such as electronic device 102B through the SDO port of electronic device 102A to the SDI port of electronic device 102B. The width of the command may specify how many serial pulses of data are to be used to represent the command. In turn, electronic device 102B may serially propagate the command or data on to other electronic devices such as electronic device 102C through the SDO port of electronic device 102B to the SDI port of electronic device 102C. In turn, electronic device 102C may serially propagate the command or data on to other electronic devices such as another electronic device (not shown) or to MCU 101 through the SDO port of electronic device 102C to the MISO port of MCU 101.

Each of electronic devices 102 may be configured to propagate a NOP (a no-operation) command on its respective SDO port until the given electronic device 102 recognizes and identifies a predefined command on its respective SDI port that matches a known pattern that is different than a NOP command. A NOP command may be, for example, a series of logic 0 bits. Once recognized and identified, the predefined command may be executed by respective electronic devices 102 when all bits of the predefined command have been fully received on the SDI port. Each electronic device 102 may copy the predefined command that arrived on its SDI port to its SDO port in parallel with executing the predefined command. This may facilitate propagation of the predefined command throughout the daisy chain with the least amount of delay and communication overhead.

The commands may be, for example, to read or write data. The source of the data that is to be read may be designated by the command. The data that is to be written and a destination of the write may be designated by the command. Each electronic device 102 may monitor its SDI port for a read command, and then for data read from others of electronic devices 102 or MCU 101 (whichever is connected further up the daisy chain). Such data from other electronic devices 102 or MCU 101 may need to be propagated through the daisy chain though the SDO ports of electronic devices 102. The data may be propagated to the MISO port of MCU 101. The read command may be recognized by electronic device 102 as being the first command received after a falling edge of the nCS signal that is identified and is different than NOP commands or signals. Furthermore, each electronic device 102 may monitor its SDI port for a write command, and then for data to be written to destinations in or communicatively connected to electronic device 102. The write command may be recognized by electronic device 102 as being the first command received after a falling edge of the nCS signal that is identified and is different than NOP commands or signals.

Each electronic device 102 may be configured to perform a read command by sending its own data (generated by executing the read command) on its SDO port after having received and recognized the read command, and after copying data of other of electronic devices 102 or MCU 101 received on its SDI port to its SDO port. Each electronic device 102 may be configured to perform a write command by writing specified data to its internal or connected destinations, and by propagating the write command on its SDO port to other of electronic devices 102 or MCU 101 further down the daisy chain.

The elements of the daisy chain may be configured to operate in a daisy chain mode of operation or in a normal mode of operation. In daisy chain mode, commands and data may be propagated from the SDI port of a given electronic device 102 to its SDO port, so that other electronic devices 102 in the daisy chain may receive and execute commands. In normal mode, commands and data might not be propagated from the SDI port of a given electronic devices 102 to its SDO port. MCU 101 and electronic devices 102 may be configured to switch between daisy chain mode and normal mode using any suitable criteria, signals, or commands. A given electronic device 102 may enter daisy chain mode from normal mode or exit daisy chain mode to normal mode upon any suitable signals or commands. Such signals or commands may be provided by MCU 101. MCU 101 may determine to set electronic devices 102 in daisy chain mode based upon any suitable condition or criteria.

Figure 2:
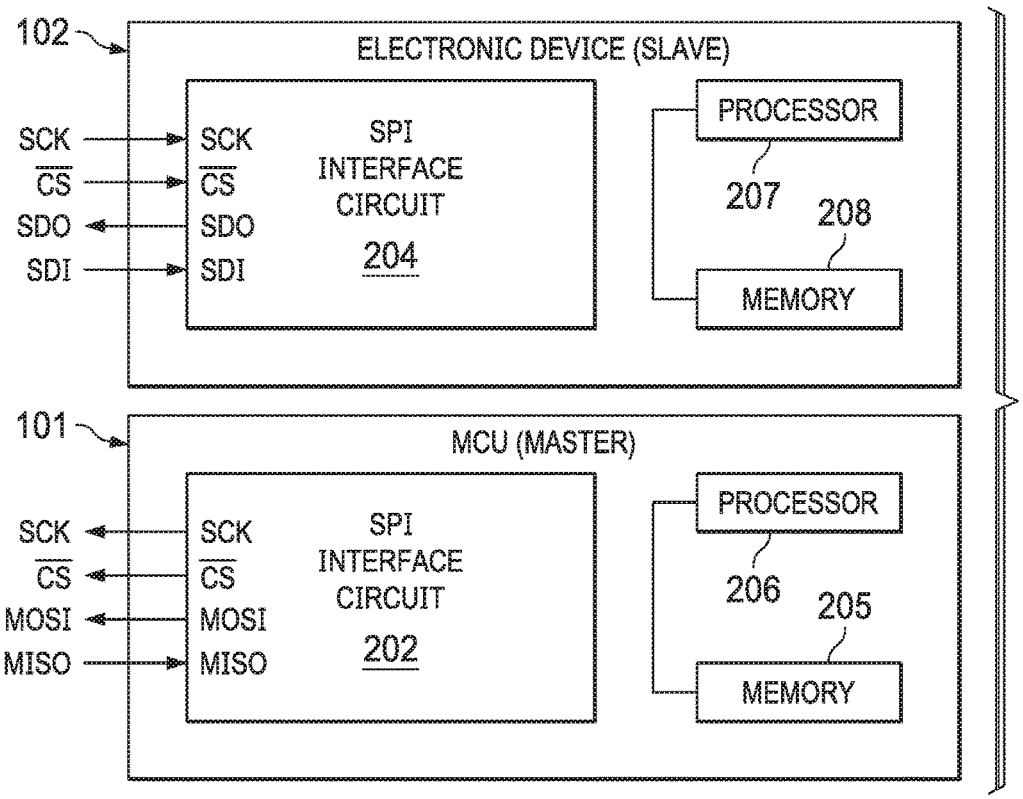
FIG. 2 is a more detailed illustration of an MCU and electronic device, according to embodiments of the present disclosure.

FIG. 2 is a more detailed illustration of MCU 101 and electronic device 102, according to embodiments of the present disclosure.

MCU 101 may include a processor 205 communicatively coupled to a memory 206. Processor 205 may include any suitable processor, and memory 206 may be any suitable persistent or non-persistent memory. Not shown are any suitable number and kind of peripherals or auxiliary circuits used by MCU 101 to perform whatever other tasks MCU 101 is designed to perform, such as an analog to digital converter (ADC) or register. Moreover, processor 205 may be configured to load and execute instructions stored in memory 206 in order to perform any suitable task.

Electronic device 102 may include a processor 207 communicatively coupled to a memory 208. Processor 207 may include any suitable processor, and memory 208 may be any suitable persistent or non-persistent memory. Not shown are any suitable number and kind of peripherals or auxiliary circuits used by electronic device 102 to perform whatever other tasks electronic device 102 is designed to perform, such as an ADC or register. Moreover, processor 207 may be configured to load and execute instructions stored in memory 208 in order to perform any suitable task.

MCU 101 and electronic device 102 may each include respective SPI interface circuits 202, 204. SPI interface circuits 202, 204 may be implemented by analog circuitry, digital circuitry, logic, instructions for execution by a processor (such as processor 205, 207, respectively), or any suitable combination thereof. The specific implementation of SPI interface circuits 202, 204 may be the same or different with respect to one another. In one embodiment, SPI interface circuits 202, 204 may be implemented in a same manner and configured to operate differently based upon, for example, a register or system or user setting. SPI interface circuit 202 may be configured to operate for the purposes of a master node such as MCU 101 and SPI interface circuit 204 may be configured to operate for the purposes of an electronic device such as electronic device 102.

In MCU 101, SPI interface circuit 202 may be configured to generate outputs to SCK and CS ports. SPI interface circuit 202 may be configured to generate outputs to send commands or data to electronic devices 102 through its MOSI port. SPI interface circuit 202 may be configured to receive data through its MISO port. SPI interface circuit 202 may be configured to generate outputs to SCK and CS ports to instruct electronic devices 102 to enter or exit different modes of operation.

In electronic device 102, SPI interface circuit 204 may be configured to monitor inputs from SCK and CS ports of electronic device 102. In one embodiment, SPI interface circuit 204 may be configured to monitor the CS port for indications of whether to reset itself, or to recognize and then execute commands incoming on the SDI port and propagate output data on the SDO port. When SPI interface circuit 204 resets itself, it may return to a reset state in the state machine therein. Memory buffers of reads or writes may be cleared. The SDO port may be set in high impedance mode. Current might not be actively consumed. SDI and SCK signals might not be internally routed. SPI interface circuit 204 might remain waiting for an nCS falling edge to resume operation. However, a bit or other information indicating whether electronic device 102 is in a streaming mode may be preserved, and not cleared, by an nCS rising edge. If such a bit or other information is not preserved, then streaming mode might need to be relaunched each time an nCS rising edge is issued. Furthermore, when performing a read command, SPI interface circuit 204 may be configured to read data from a designated source and provide its own data through the SDO port. Electronic device 102 may include any suitable number and kind of mechanisms for use with the operations of SPI interface circuit 204. MCU 101 may include any suitable number and kind of mechanisms for use with the operations of SPI interface circuit 202.

SPI interface circuit 204 may be configured to receive a command from an upstream node, such as MCU 101 or another instance of electronic device 102. The command may be received through the SDI port. The command may have originated from MCU 101 and SPI interface circuit 204 may be configured to propagate the command through its SDO port. The CS port may be configured to receive chip select signals from an electronic device such as MCU 101. SPI interface circuit 204 may be configured to receive information through the SDI port. The information may include a command for electronic device 102, data associated with a command, a command for another electronic device 102, or a complex command to perform additional commands later that are specific to electronic device 102. Based on reception of a first command such as a complex command in the information, SPI interface circuit 204 may be configured to monitor additional information received through the SDI port. SPI interface circuit 204 may be configured to again receive information. SPI interface circuit 204 may be configured to determine whether the information includes another command, wherein this second command is to be selectively executed by electronic device 102. The selective execution may be selective in that electronic device 102 may execute the second command, but one or more other instances of electronic device 102 might not execute the command. If the second command is to be executed by electronic device 102, it may be executed. The second command, along with any data generated as a result of executing the second command or data accompanying the second command, may be copied to the SDO port. SPI interface circuit 204 may be configured to determine whether to selectively execute the second command based at least in part on a position of electronic device 102 in the daisy chain. For example, SPI interface circuit 204 may be configured to selectively execute the second command based on whether the second command was received in an order, among other commands, that corresponds to the position of electronic device 102 in the daisy chain. A counting of commands may be initiated after successful reception of the first command, wherein upon each subsequent command, a given electronic device 104 keeps count of the number of issued commands. SPI interface circuit 204 may be configured to determine its position in any suitable manner. When the number of issued commands matches the position of electronic device 102, SPI interface circuit 204 may be configured to determine that the most recently received command is to be executed by electronic device 102. SPI interface circuit 204 may be configured to receive a changed edge on the CS port in conjunction with the first command. The changed edge on the CS port in conjunction with the first command may establish that the first command is to be executed. SPI interface circuit 204 may be configured to execute the second command upon a changed edge on CS port subsequent to receiving the second command. SPI interface circuit 204 may be configured to copy other information to the SDO port. The other information might be received before the second command, while electronic device 102 is in a daisy chain mode. SPI interface circuit 204 may be configured to determine that the second command is a read command, execute it to generate read data, and substitute portions of the information that contained the second command with the read data. The results from this substitution may be copied to the SDO port. The portions of the information that contained the second command that were substituted may have included NOPs issued by MCU 101 as placeholders for the read data during propagation between electronic devices 102 further up the daisy chain from the designated electronic device 102.

SPI interface circuit 202 may be configured to determine that a given electronic device 102 in the daisy chain is to selectively execute a first command. Other electronic devices 102 may be determined to selectively execute other commands. SPI interface circuit 202 may be configured to, based on a determination that the given electronic device 102 is to execute the first command, issue a complex command to the first electronic device 102 in a daisy chain, through the MOSI port. The complex command may indicate to electronic devices 102 that additional, subsequent commands are to be selectively executed. SPI interface circuit 202 may be configured to, subsequent to issuing the complex command, issue the first command to the daisy chain of electronic devices 102 through the MOSI port. The first command is to be selectively executed by the given electronic device 102 and not executed by one or more other electronic devices 102 in the daisy chain. Other commands may be issued to the daisy chain of electronic devices 102 through the MOSI port. The first command and the other commands may be issued in an order that corresponds to the position of electronic devices 102 that are to selectively execute the corresponding command. If an electronic device 102 is to execute no commands, then MCU 101 may be configured to issue NOPs to the daisy chain in a position in the stream of commands that corresponds to the electronic device 102. Thus, SPI interface circuit 202 may be configured to issue additional information before or after the first command such that a position of the first command among such additional information corresponds to a position of the given electronic device in the daisy chain. A position of the additional information before or after the first command corresponds to other electronic devices 102 in the daisy chain, other than the given electronic device 102 that is to execute the first command. SPI interface circuit 202 may be configured to issue the first command as a read operation. SPI interface circuit 202 may be configured to issue a second command to the daisy chain. The second command may be a write operation. The write operation may be to be executed by another electronic device. Thus, in the stream of commands, a mixture of read and write operations may be included. Moreover, commands for other operations requiring no read or write may be included in the stream of commands.

FIGS. 3-9 are timing diagrams for executing commands, according to embodiments of the present disclosure.

In FIGS. 3-9, graph 302 illustrates a plot of an nCS signal issued by MCU 101 and received by electronic devices 102. Elapsed time within the context of FIGS. 3-9 may be expressed in bytes, wherein a given byte represents eight clock pulses.

Graph 304 illustrates a plot of an SCK signal issued by MCU 101 and detected at each electronic device 102. During serial data transfer between MCU 101 and electronic devices 102, each pulse of the SCK signal may be used to transfer a single bit serially per serial data line. SCK signals may be issued as idle, which may be a logic low or logic high level, or in blocks representing continuous clocking or clock pulses. These may be used so that each SDI/SDO/MISO/MOSI signal is synchronized.

Graph 306 illustrates a plot of signals issued by MCU 101 on its MOSI port and received by electronic device 102A on its SDI port, denoted as SDI1.

Graph 308 illustrates a plot of signals issued by electronic device 102A on its SDO port, denoted as SDO1, and received by electronic device 102B on its SDI port, denoted as SDI2.

Graph 310 illustrates a plot of signals issued by electronic device 102B on its SDO port, denoted as SDO2, and received by electronic device 102C on its SDI port, denoted as SDI3.

Graph 312 illustrates a plot of signals issued by electronic device 102C on its SDO port, denoted as SDO3, and received by MCU 101 on its MISO port.

Figure 3:
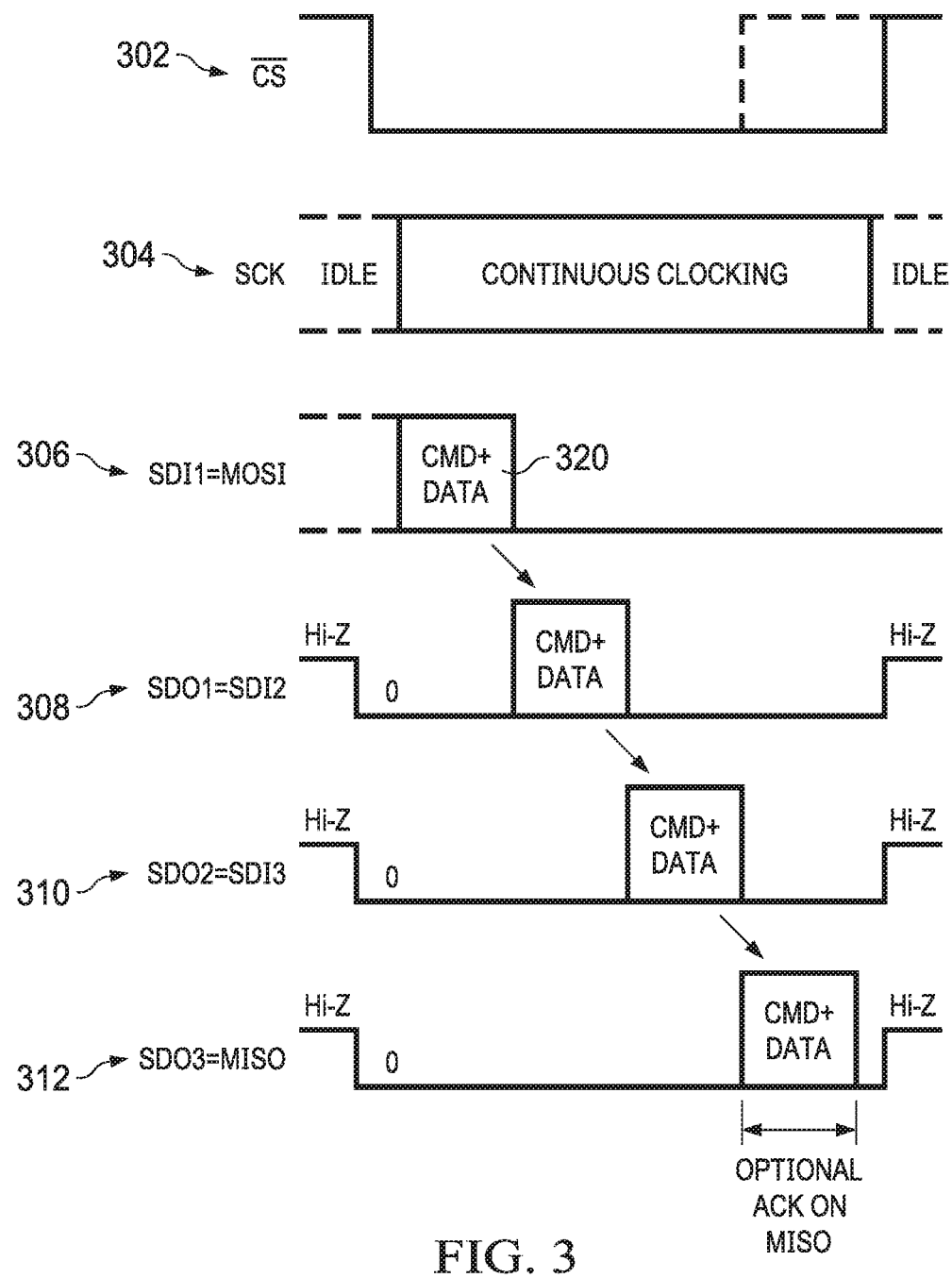
FIG. 3 is a timing diagram of propagation and execution of a command, according to embodiments of the present disclosure.

FIG. 3 is a timing diagram of propagation and execution of a command 320, according to embodiments of the present disclosure. Command 320 may be, for example, a write command or a fast command. Command 320 may also include data to be written or acting as parameters for execution of command 320. A fast command may include a command that requires no additional information or data bytes to be returned from a given electronic device 102. Command 320 may be of a given length, such as a byte, and data may be a predetermined length, such as three bytes for data to be written or for data to be read.

Before the events shown in FIG. 3, MCU 101 may place electronic devices 102 into a daisy chain mode. Electronic devices 102 may be placed into daisy chain mode using any suitable signals or commands.

MCU 101 may send a falling edge on an nCS signal to each of electronic devices 102, as shown in graph 302. Thereafter, MCU 101 may provide continuous clocking on the SCK signal, as shown in graph 304. MCU 101 may issue command 320 to electronic device 102A on its SDI port as shown in graph 306.

When command 320 has been fully received by electronic device 102A, electronic device 102A may write command 320 to its SDO port and to the SDI port of electronic device 102B, as shown in graph 308.

When command 320 has been fully received by electronic device 102B, electronic device 102B may write command 320 to its SDO port and to the SDI port of electronic device 102C, as shown in graph 310.

When command 320 has been fully received by electronic device 102C, electronic device 102C may optionally write command 320 to its SDO port and to the MISO port of MCU 101, as shown in graph 312. This write may be optional as such a write may be terminated or prevented if MCU 101 issues another changed edge, such as a rising edge, on the nCS signal, before command 320 is written to the MISO port. However, as shown in FIG. 3, MCU 101 may wait until command 320 is written to the MISO port before issuing another changed edge, such as a rising edge, on the nCS signal to electronic devices 102. Thus, the write of command 320 to the MISO port may serve as an acknowledgment to MCU 101 that command 320 has successfully propagated through the daisy chain.

In one embodiment, each of electronic devices 102 may be configured to execute command 320 when command 320 has been fully received at a respective one of electronic devices 102. In such an embodiment, execution of command 320 might be asynchronous between electronic devices 102. In another embodiment, each of electronic devices 102 may be configured to delay execution of command 320 until a synchronization signal, such as a rising edge on the nCS signal, is received. In such an embodiment, execution of command 320 might be synchronous between electronic devices 102.

As shown in FIG. 3, each individual electronic device 102 may receive command 320 and execute command 320. Thus, command 320 may be directed to all of electronic devices 102, and might not be specified to be applied to a single one or a subset of electronic devices 102. Embodiments of the present disclosure may provide additional flexibility wherein individual electronic devices 102 may be addressed by a command, as discussed in further detail below.

Figure 4:
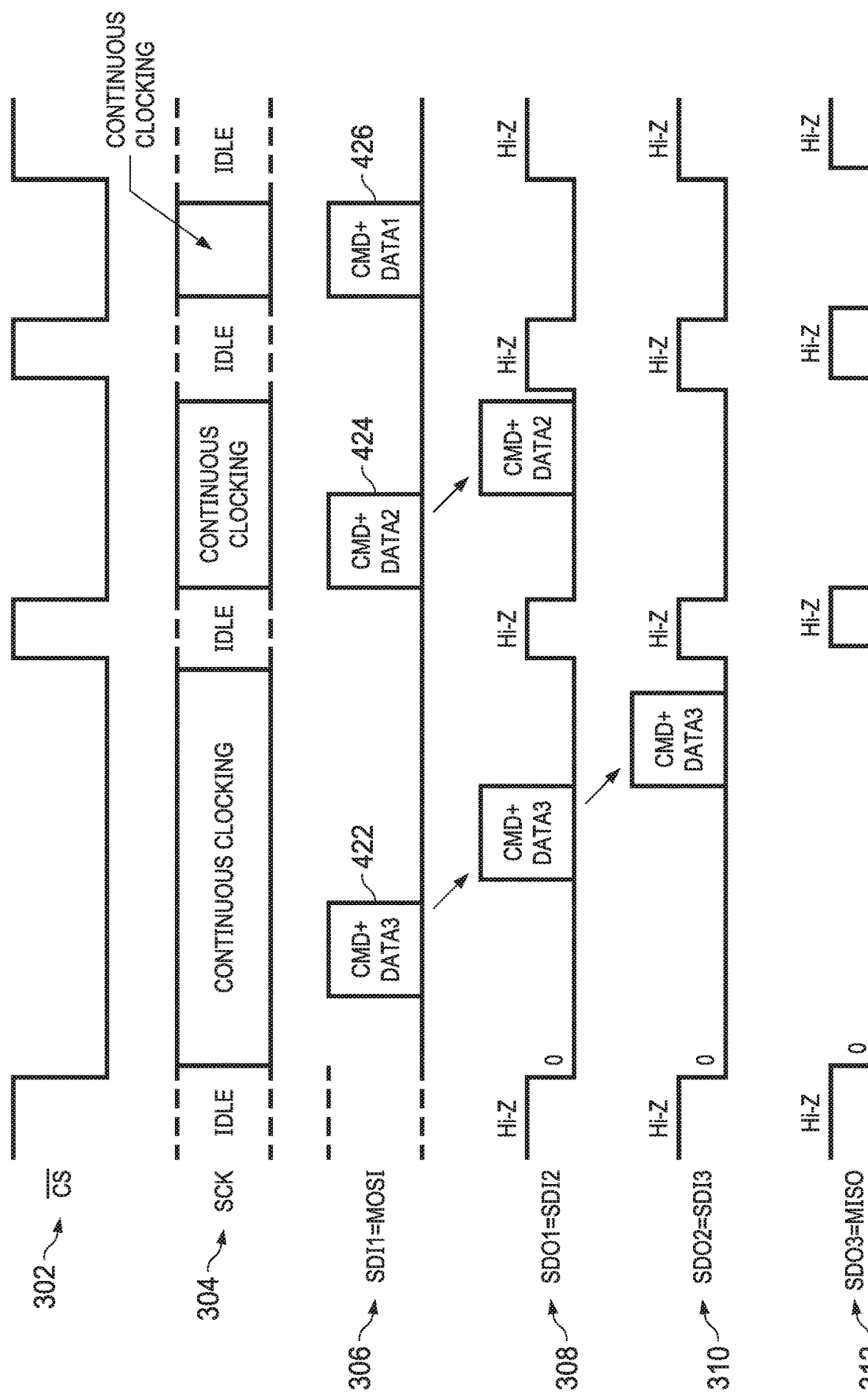
FIG. 4 is an illustration of propagation and execution of further commands, according to embodiments of the present disclosure.

FIG. 4 is an illustration of propagation and execution of commands 422, 424, 426, according to embodiments of the present disclosure.

Commands 422, 424, 426 may be, for example, a write command. Commands 422, 424, 426 may also be implemented as fast commands. A fast command may include a command that requires no additional information to be returned from a given electronic device 102. Each of commands 422, 424, 426 may include data to be written or acting as parameters for execution of the respective command. In one embodiment, each of commands 422, 424, 426 may designate a particular electronic device 102 or subset of electronic devices 102 to execute the command. The designated electronic device 102 may execute the command and propagate the command to the remaining electronic devices 102 in the daisy chain. Other electronic devices 102, not designated by the command, may propagate the command to the remaining electronic devices 102 in the daisy chain without executing the command itself.

For example, command 422 may designate that electronic device 102C write a set of data to a destination. Command 424 may designate that electronic device 102B write a set of data to a destination. Command 426 may designate that electronic device 102C write a set of data to a destination. Commands 422, 424, 426 may designate any suitable data to be written to any suitable destination in or communicatively coupled to electronic devices 102.

Before the events shown in FIG. 4, MCU 101 may place electronic devices 102 into a daisy chain mode. Electronic devices 102 may be placed into daisy chain mode using any suitable signals or commands.

Upon a changed edge such as a falling edge of the nCS signal, each of electronic devices 102 may await commands to execute. MCU 101 may issue continuous clock signals through the SCK signal until a subsequent changed edge, such as a rising edge, of the nCS signal. The second changed edge, such as the rising edge, of the nCS signal may indicate that a given command that was propagated is to be executed. Moreover, a third changed edge, such as a rising edge, of the nCS signal may indicate that additional or new commands might be sent.

MCU 101 may issue command 422 on its MOSI port to the SDI port of electronic device 102A. As command 422 designates electronic device 102C for execution, and not electronic device 102A, electronic device 102A may propagate command 422 without executing command 422. Electronic device 102A may write command 422 to its SDO port to the SDI port of electronic device 102B. As command 422 designates electronic device 102C for execution, and not electronic device 102B, electronic device 102B may propagate command 422 without executing command 422. Electronic device 102B may write command 422 to its SDO port to the SDI port of electronic device 102C. Command 422 may thus be received at its designated electronic device—electronic device 102C. Electronic device 102C may be configured to execute command 422. Electronic device 102C may be configured to execute command 422 after fully receiving command 422 or upon a subsequent rising edge of the nCS signal. Electronic device 102C may be configured to propagate command 422 to any further electronic devices 102 in the daisy chain or to MCU 101. However, as shown in FIG. 4, MCU 101 may issue a changed edge on the nCS signal before electronic device 102C further propagates command 422 into the daisy chain. The SDO port of electronic device 102C and the MISO port of MCU 101 may remain logic low.

Upon issuance of the changed edge, such as a rising edge, of the nCS signal, command 422 may be executed, if it has not already been executed. SDO ports of electronic devices 102 may be placed in a high impedance mode while the nCS signal is at a logic high level. The SCK signal may be idle.

MCU 101 may be configured to issue a changed edge, such as a falling edge, of the nCS signal to signal to electronic devices 102 to watch for further commands. MCU 101 may issue command 424 on its MOSI port to the SDI port of electronic device 102A. As command 424 designates electronic device 102B for execution, and not electronic device 102A, electronic device 102A may propagate command 424 without executing command 424. Electronic device 102A may write command 424 to its SDO port to the SDI port of electronic device 102B. Command 424 may thus be received at its designated electronic device—electronic device 102B. Electronic device 102B may be configured to execute command 424. Electronic device 102B may be configured to execute command 424 after fully receiving command 424 or upon a subsequent rising edge of the nCS signal. Electronic device 102B may be configured to propagate command 424 to any further electronic devices 102 in the daisy chain or to MCU 101. However, as shown in FIG. 4, MCU 101 may issue a changed edge on the nCS signal before electronic device 102B further propagates command 424 into the daisy chain. The SDO ports of electronic device 102B, 102C and the MISO port of MCU 101 may remain logic low by sending only NOP commands and thus being left in standby, without executing further commands.

Upon issuance of the changed edge, such as a rising edge, of the nCS signal, command 424 may be executed, if it has not already been executed. SDO ports of electronic devices 102 may be placed in a high impedance mode while the nCS signal is at a logic high level. The SCK signal may be idle.

MCU 101 may be configured to issue a changed edge, such as a falling edge, of the nCS signal to signal to electronic devices 102 to watch for further commands. MCU 101 may issue command 426 on its MOSI port to the SDI port of electronic device 102A. Command 426 may thus be received at its designated electronic device—electronic device 102A. Electronic device 102A may be configured to execute command 426. Electronic device 102A may be configured to execute command 426 after fully receiving command 426 or upon a subsequent rising edge of the nCS signal. Electronic device 102A may be configured to propagate command 426 to any further electronic devices 102 in the daisy chain or to MCU 101. However, as shown in FIG. 4, MCU 101 may issue a changed edge on the nCS signal before electronic device 102A further propagates command 426 into the daisy chain. The SDO ports of electronic devices 102A, 102B, 102C and the MISO port of MCU 101 may remain logic low.

Upon issuance of the changed edge, such as a rising edge, of the nCS signal, command 426 may be executed, if it has not already been executed. SDO ports of electronic devices 102 may be placed in a high impedance mode while the nCS signal is at a logic high level. The SCK signal may be idle.

While FIG. 4 illustrates how commands may designate a particular electronic device 102, different command instances are needed for each electronic device. The command instances may be different commands altogether, or commands issued with different operation parameters. Furthermore, additional commands are needed to designate other operations, such as write commands. Moreover, execution of these commands in FIG. 4 uses additional changed edges on the nCS signal between execution of each command.

Figure 5:
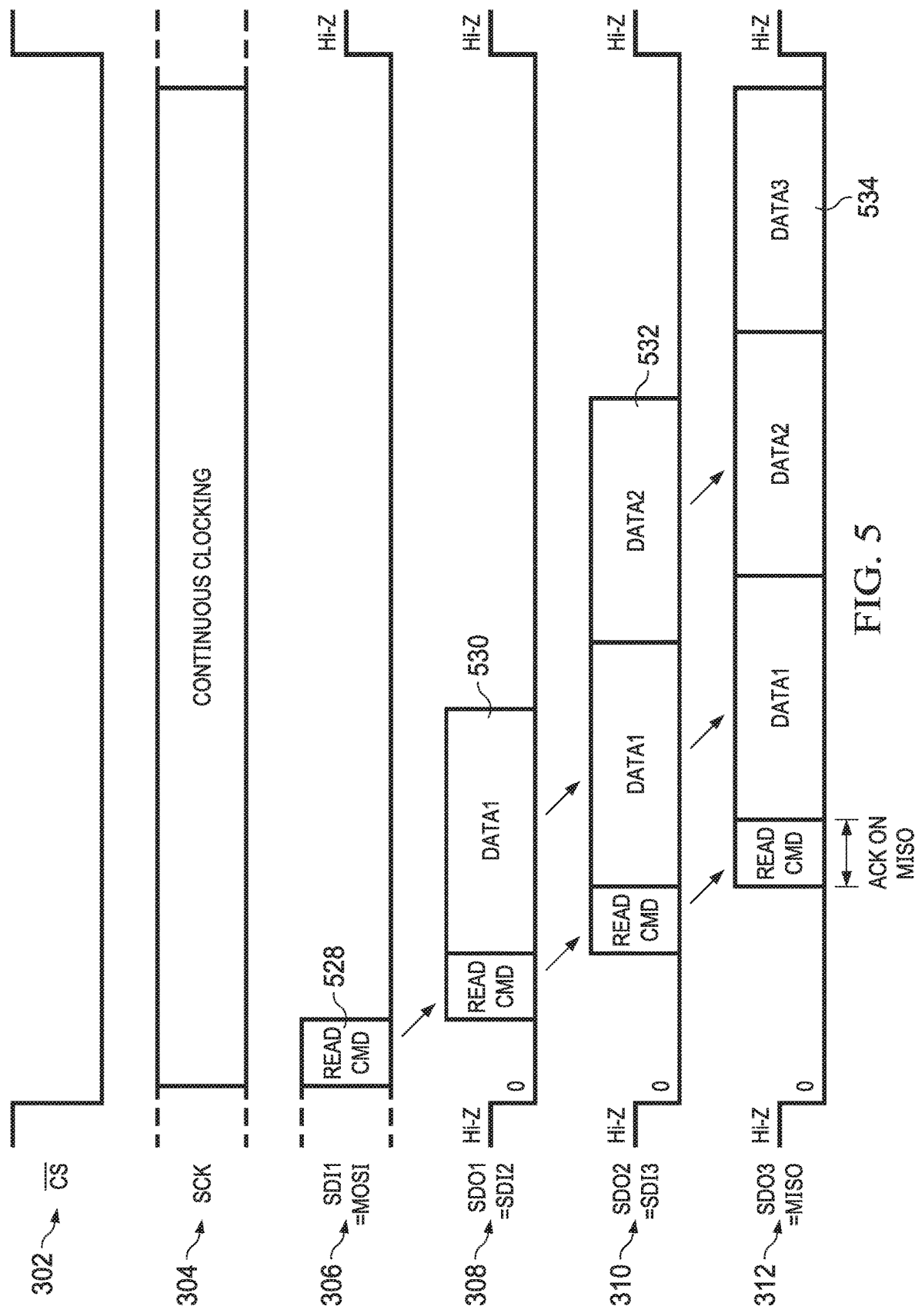
FIG. 5 is an illustration of propagation and execution of a read command, according to embodiments of the present disclosure.

FIG. 5 is an illustration of propagation and execution of a read command 528, according to embodiments of the present disclosure.

Command 528 may be implemented as a read command. The destination of from where data is to be read may be specified by command 528, within operating parameters of command 528, or implicit based upon the identify of command 528. Each electronic device 102 may receive command 528 and perform the designated read operation. Moreover, each electronic device 102 may propagate command 528, any received data from electronic devices 102 further up the daisy chain, and its own read data to electronic devices 102 or MCU 101 further down the daisy chain.

Before the events shown in FIG. 5, MCU 101 may place electronic devices 102 into a daisy chain mode. Electronic devices 102 may be placed into daisy chain mode using any suitable signals or commands.

Upon a changed edge such as a falling edge of the nCS signal, each of electronic devices 102 may await commands to execute. MCU 101 may issue continuous clock signals through the SCK signal until a subsequent changed edge, such as a rising edge, of the nCS signal. The second changed edge, such as the rising edge, of the nCS signal may indicate that MCU 101 has received data read by all electronic devices 102, and the interface circuits therein may be reset.

MCU 101 may issue command 528 on its MOSI port to the SDI port of electronic device 102A. Electronic device 102A may, after fully receiving command 528, execute command 528 to read data from the designated source. The data may be referenced in FIG. 5 as DATA1 530. After receiving command 528, electronic device 102A may be configured to begin propagating command 528 and DATA1 530 on its SDO port to the SDI port of electronic device 102B.

Electronic device 102B may, after fully receiving command 528, execute command 528 to read data from the designated source. The data may be referenced in FIG. 5 as DATA2 532. After receiving command 528, electronic device 102B may be configured to begin propagating command 528, DATA1 530, and DATA2 532 on its SDO port to the SDI port of electronic device 102C.

Electronic device 102C may, after fully receiving command 528, execute command 528 to read data from the designated source. The data may be referenced in FIG. 5 as DATA3 534. After receiving command 528, electronic device 102C may be configured to begin propagating command 528, DATA1 530, DATA2 532, and DATA3 534 on its SDO port to the MISO port of MCU 101.

MCU 101, upon receiving read command 528, may determine that the read command successfully propagated through the daisy chain of electronic devices 102. MCU 101 may interpret this as an acknowledgment signal. MCU 101 may receive and utilize the data following read command 528 that was generated by electronic devices 102.

Each electronic device 102 may transmit its read data at a time according to any suitable scheme or mechanism. For example, each electronic device 102 may determine its position within the daisy chain. The position may be determined in any suitable manner. For example, a given electronic device count the number of bytes between the falling edge of the nCS signal and the end of the reception of command 528. Electronic device 102A might thus have a position of one, electronic device 102B might have a position of two, and electronic device 102C might have a position of three.

Based upon the position of the given electronic device 102 within the daisy chain, and upon the length of the data to be generated by each electronic device 102, a delay or time after read command 528—in which the given electronic device 102 is to transmit its own data—may be determined. For example, each electronic device 102 may calculate its position less one, then multiply the result times the length of data.

However, this approach to executing commands may require multiple different commands, or multiple and unnecessary instances of such commands. For example, a command that is only intended for a single electronic device 102 must nevertheless be issued to all electronic devices 102. The data from the unintended electronic devices 102 might be simply discarded, but the length of time to execute may be long as each electronic device 102 propagates data from all upstream electronic devices 102 in the daisy chain. This may cause significant overhead or delay to perform a read from a single electronic device 102.

Figure 6:
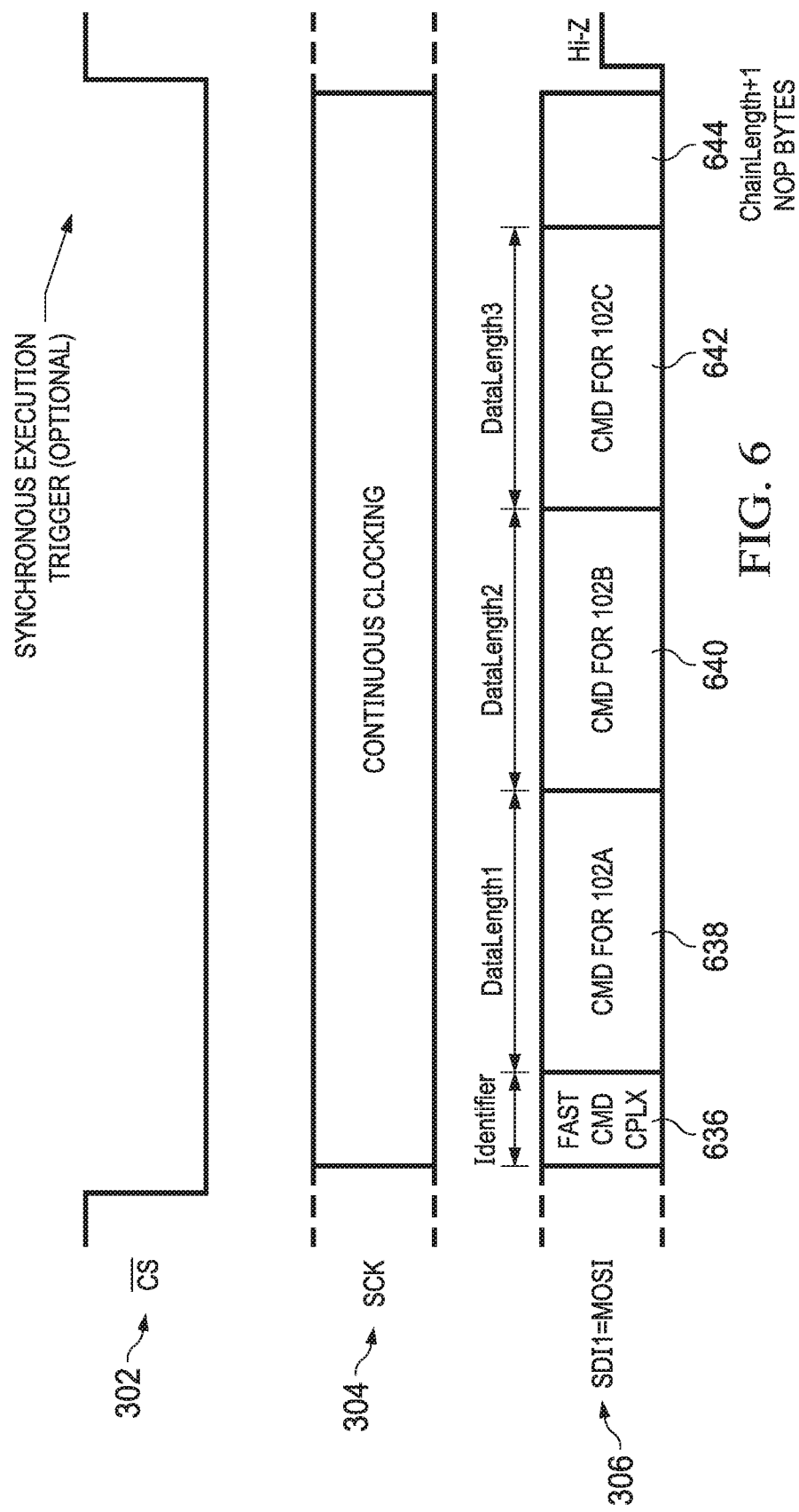
FIG. 6 illustrates issuance of a complex command and associated other commands, according to embodiments of the present disclosure.
Figure 7:
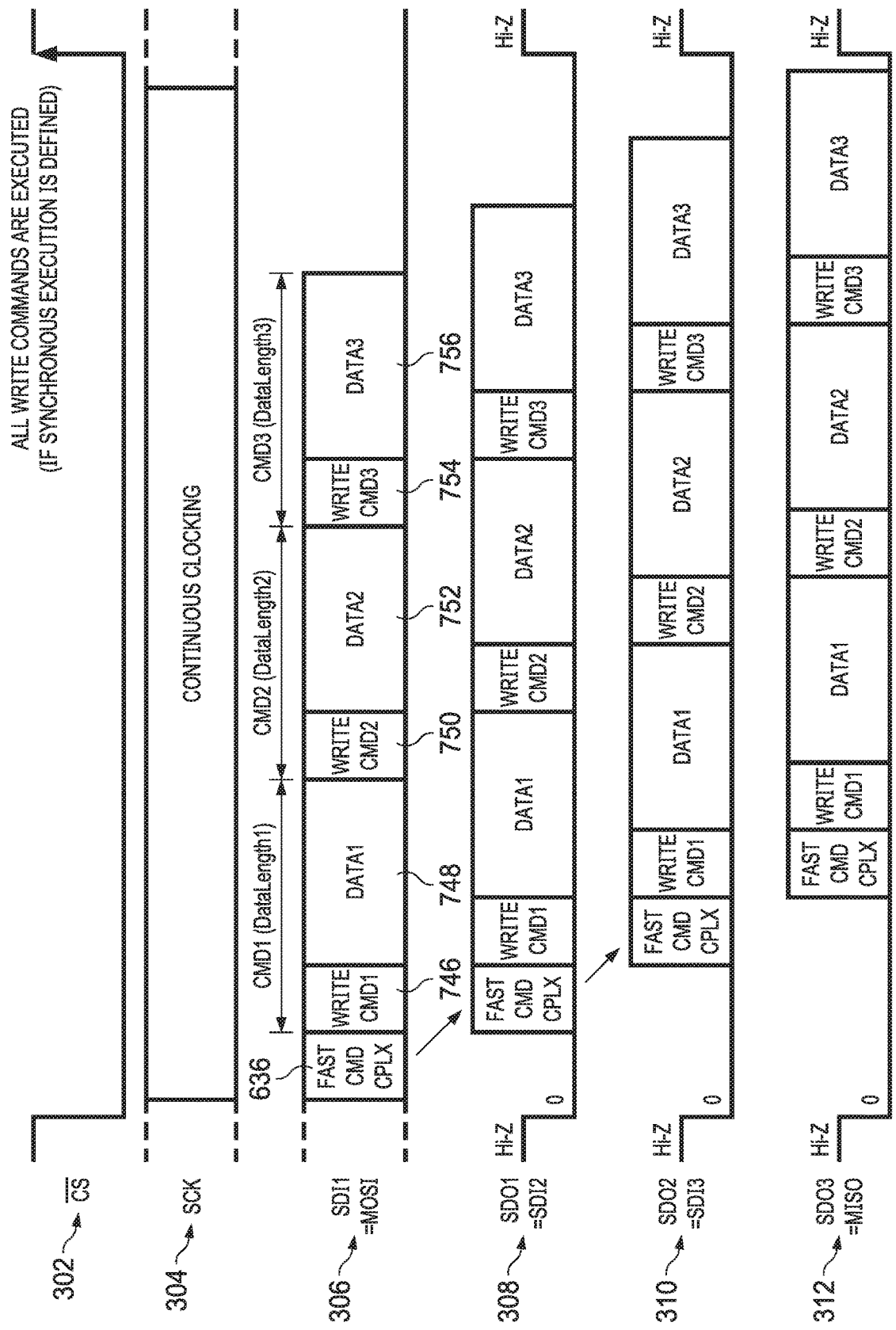
FIG. 7 illustrates execution of write commands within the context of complex commands, according to embodiments of the present disclosure.
Figure 8:
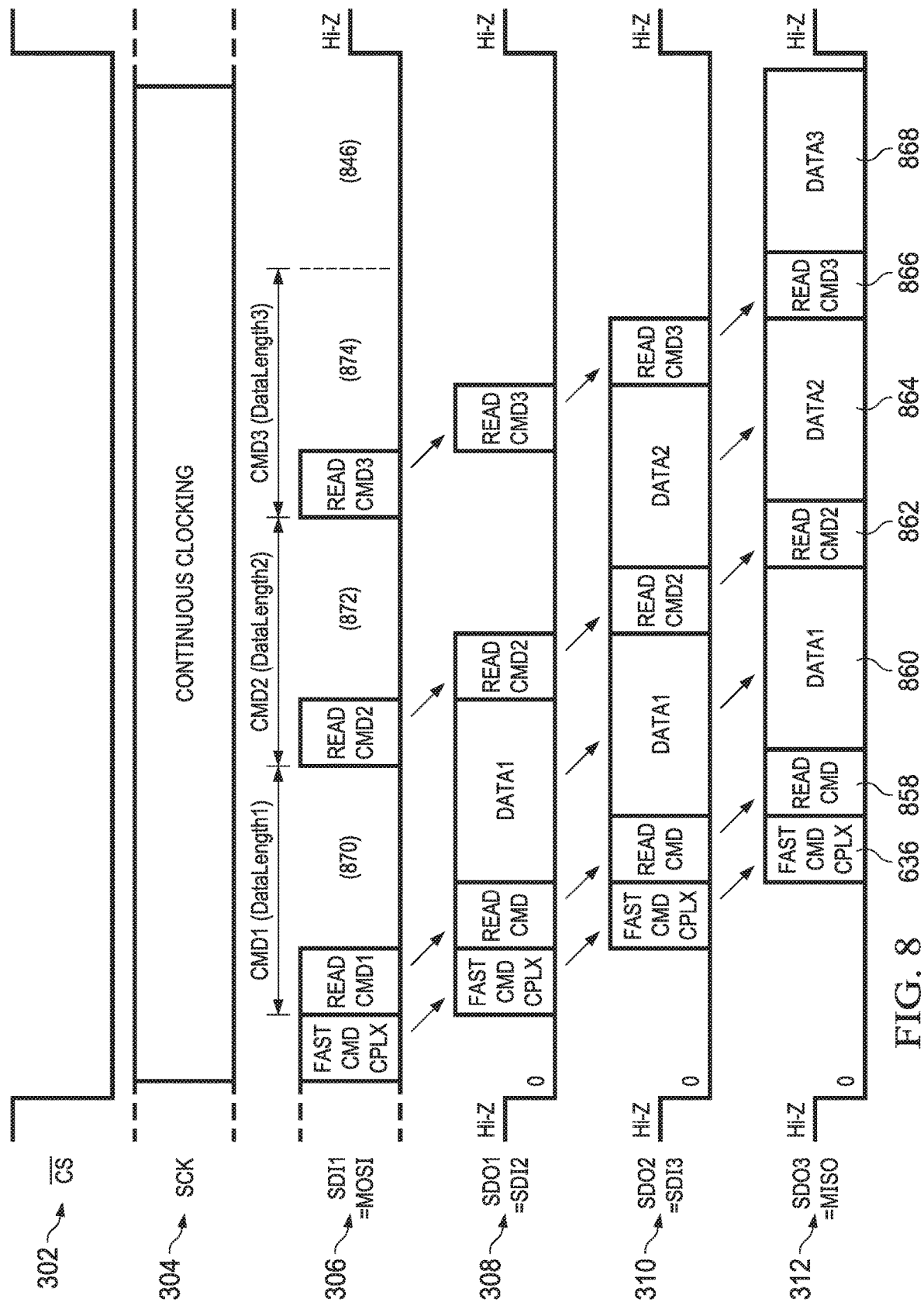
FIG. 8 illustrates execution of read commands within the context of complex commands, according to embodiments of the present disclosure.
Figure 9:
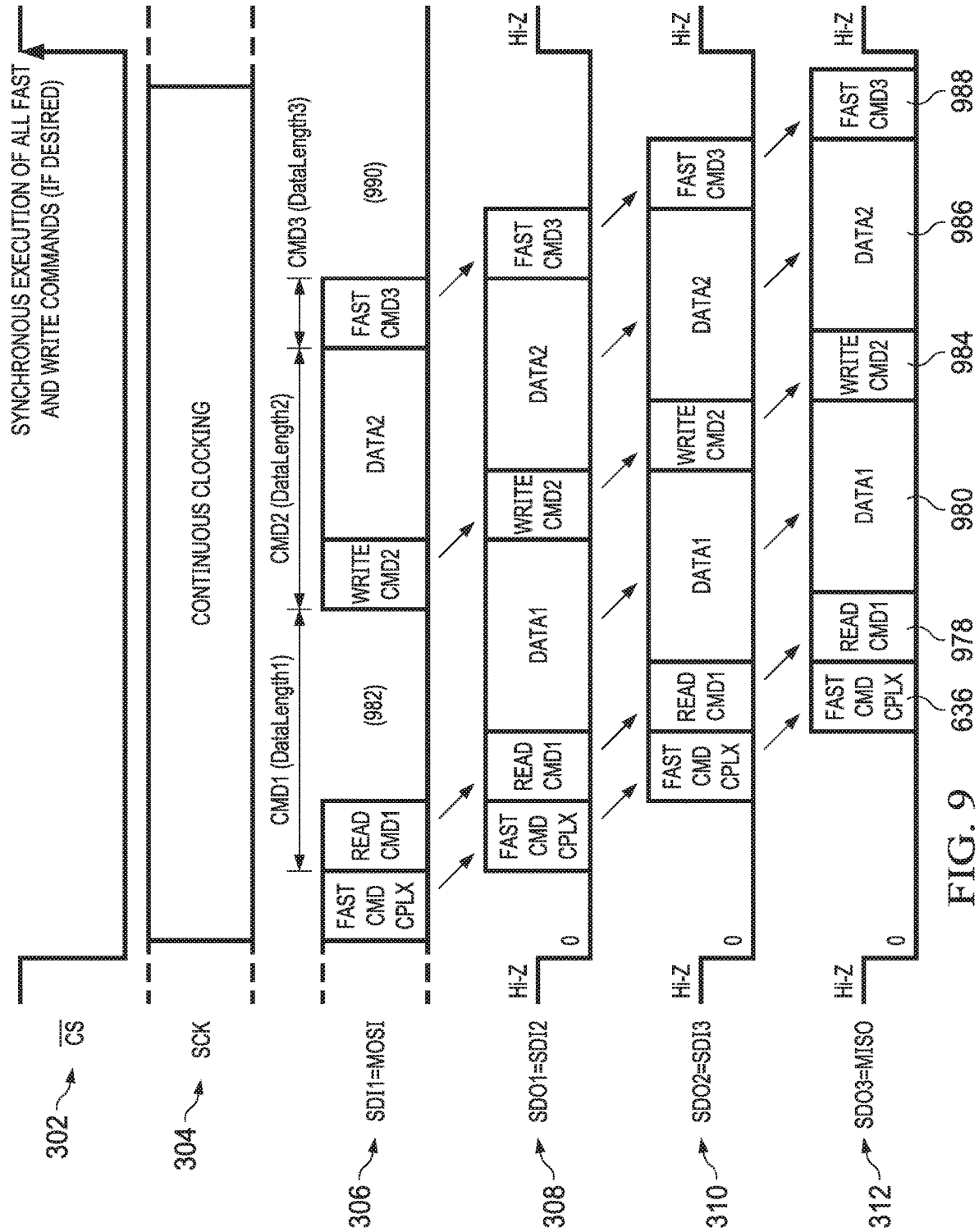
FIG. 9 illustrates execution of a mixture of read, write, and fast commands within the context of complex commands, according to embodiments of the present disclosure.

FIG. 6 illustrates issuance of a complex command 636 and associated other commands, according to embodiments of the present disclosure. In FIG. 6, only the first issuance of such a complex command 636 and associated other commands from MCU 101 to electronic device 102A is shown. Further propagation of these commands from electronic device 102A to the other electronic devices 102 in the daisy chain is not illustrated, as FIG. 6 illustrates a template for use of complex command 636. Specific uses of complex command 636, including propagation through the daisy chain, are illustrated in FIGS. 7-9.

Complex command 636 may be a fast command. Thus, no data might need to be returned in reply from electronic devices due to the execution of complex command 636 alone. However, additional commands following complex command 636 might not be fast commands.

Complex command 636 may be of any suitable length, such as a byte. Complex command 636 may be an indication that one or more types of commands are to follow complex command 636, such as a possible mixture of reads and writes. Moreover, complex command 636 may be an indication that commands specific to individual electronic devices 102 are to follow complex command 636.

Before the events shown, MCU 101 may place electronic devices 102 into a daisy chain mode. Electronic devices 102 may be placed into daisy chain mode using any suitable signals or commands.

MCU 101 may issue complex command 636 after issuing a changed edge, such as a falling edge, on the nCS signal. MCU 101 may wait until all associated commands have propagated through the daisy chain of electronic devices 102 before issuing another changed edge, such as a rising edge, on the nCS signal. While the nCS signal is logic low, the SCK clock may be providing continuous clock signals.

In one embodiment, complex command 636 may be followed by commands, or at least gaps for commands, for each of electronic devices 102. For example, if there are three electronic devices 102 in the daisy chain, then three commands may be allocated after complex command 636. The length of the daisy chain may be given as ChainLength. As shown in FIG. 6, following complex command 636, MCU 101 may issue command 638. Command 638 may be designated for execution by electronic device 102A. Command 638 may have a length given by DataLength1. Then, MCU 101 may issue command 640. Command 640 may be designated for execution by electronic device 102B. Command 640 may have a length given by DataLength2. Then, MCU 101 may issue command 642. Command 642 may be designated for execution by electronic device 102C. Command 642 may have a length given by DataLength3. The number of commands following complex command 636 may be ChainLength.

In one embodiment, following commands for each of electronic devices 102, MCU 101 may be configured to issue a series of NOP bytes 644. The length or number of NOP bytes 144 may be sufficient to allow commands 636, 638, 640, 642 to fully propagate to all intended recipient electronic devices 102 in the daisy chain.

As the stream of commands and NOP bytes 644 are received on an SDI port of a given electronic device 102, the given electronic device 102 may propagate the received information by copying the received information to its SDO port. Electronic devices 102 may be configured to copy the received information to the respective SDO ports with any suitable delay. For example, the delay may be a bit, wherein after receiving a bit, the bit is propagated, or the delay may be a byte, wherein after receiving a full byte, the byte is propagated. The illustration of FIG. 6 may assume that the delay is a byte.

Thus, given a length of the daisy chain or quantity of electronic devices ChainLength, the size of NOP bytes 644 may be given as (ChainLength+1) bytes. If the delay of a given electronic device 102 for propagating received information is different, then the size of NOP bytes 644 may be adjusted accordingly. NOP bytes 644 may thus be configured to account for the delays caused by electronic devices 102 in propagating information. Furthermore, the entire sequence of commands 636, 638, 640, 642 and NOP bytes 644 may be sufficiently long for commands 636, 638, 640, 642 to have fully propagated to all electronic devices 102. After transmitting NOP bytes 644, MCU 101 may be configured to issue a changed edge, such as a rising edge, on the nCS signal.

Each electronic device 102 receiving commands 636, 638, 640, 642 may analyze each such command, and determine whether a received command is intended for execution by itself. For example, each electronic device 102 may recognize that complex command 636 is intended for execution by itself and to prepare itself for additional commands. Electronic device 102A may be configured to recognize that command 638 is to be executed by itself, but that commands 640, 642 are not be executed by electronic device 102A. Commands 640, 642 are to be merely propagated to the rest of the daisy chain, after propagating commands 636, 638. Similarly, electronic device 102B may be configured to recognize that command 640 is to be executed by itself, but that commands 638, 642 are not be executed by electronic device 102B. Commands 638, 642 are to be merely propagated to the rest of the daisy chain within the sequence of propagating commands 636, 638, 640, 642. Similarly, electronic device 102C may be configured to recognize that command 642 is to be executed by itself, but that commands 638, 640 are not be executed by electronic device 102C. Commands 638, 640 are to be merely propagated to the rest of the daisy chain within the sequence of propagating commands 636, 638, 640, 642. Each electronic device 102 may be configured to analyze a given command and determine a command length, so that the start and end of the command are known. Each electronic device, at a position n, may select the nth command of the sequence following complex command 636 as its command to execute.

As described in further detail below, write and fast commands that are issued by MCU 101 (for example, one of commands 638, 640, 642) may or may not have their execution at electronic devices 102 delayed until a subsequent changed edge of the nCS signal. By delaying execution until such a subsequent changed edge of the nCS signal, such as a rising edge, the execution of these commands may be synchronous. Otherwise, the execution of these commands may be asynchronous.

As described in further detail below, read commands that are issued by MCU 101 (for example, one of commands 638, 640, 642) may be followed by issuance of NOP bytes. The length of the NOP bytes may be sufficiently long to include data generated as a response to execution of the command. Such a read command, implemented by one of commands 638, 640, 642, may have a DataLength that includes sufficient space for both the command itself and for the NOP bytes or data returned from executing the command. Thus, the representation of a given one of commands 638, 640, 642 in FIG. 6 may illustrate both the command itself and space for data generated as a response to execution of the command. Although the length of each of commands 638, 640, 642 is shown as the same length, the length of each of commands 638, 640, 642 may vary according to the nature of the specific command to be executed.

A given electronic device 102 may be configured to, when receiving a read command not intended for execution by the given electronic device 102, the contents of the command for the specified DataLength may be merely propagated from the SDI port to the SDO port. However, a given electronic device may be configured to, when receiving a read command that is intended for execution by the given electronic device 102, propagate the read command followed by the generated data instead of the NOP bytes.

Different electronic devices 102 may have differently sized registers. This may cause commands 638, 640, 642 to have different lengths, even if such commands 638, 640, 642 are for the same type of operation. For example, electronic device 102A may have 16-bit registers, while electronic device 102B may have 8-bit registers. Thus, a write command for the same substantive data (such as "0000 0000 1010 1010") for electronic device 102A may and electronic device 102B may be of different lengths. If commands are of different lengths depending upon a targeted electronic device 102, then each electronic device 102 may know the size of a given command, even if the given command is not to be executed by electronic device 102. Each electronic device 102, upon recognizing the command and thus its length, may apply the correct data length for the command.

FIG. 7 illustrates execution of write commands within the context of complex commands, according to embodiments of the present disclosure.

Before the events shown, MCU 101 may place electronic devices 102 into a daisy chain mode. Electronic devices 102 may be placed into daisy chain mode using any suitable signals or commands.

Similar to FIG. 6, in FIG. 7, MCU 101 may issue complex command 636 after issuing a changed edge, such as a falling edge, on the nCS signal. MCU 101 may wait until all associated commands have propagated through the daisy chain of electronic devices 102 before issuing another changed edge, such as a rising edge, on the nCS signal. While the nCS signal is logic low, the SCK clock may be providing continuous clock signals.

As shown in graph 306, after issuing complex command 636 to electronic device 102A from the MOSI port to the SDI port of electronic device 102A, MCU 101 may be configured to issue a write command 746 and DATA1 748 to be written. The combination of write command 746 and DATA1 748 to be written may form an overall write command. This overall write command may be intended for execution by electronic device 102A and may have a length of DataLength1. Write command 746 and DATA1 748 may be issued from the MOSI port to the SDI port of electronic device 102A.

Next, MCU 101 may be configured to issue another write command 750 and DATA2 752 to be written. The combination of write command 750 and DATA2 752 to be written may form an overall write command. This overall write command may be intended for execution by electronic device 102B and may have a length of DataLength2. Write command 750 and DATA2 752 may be issued from the MOSI port to the SDI port of electronic device 102A.

Next, MCU 101 may be configured to issue yet another write command 754 and DATA3 756 to be written. The combination of write command 754 and DATA3 756 to be written may form an overall write command. This overall write command may be intended for execution by electronic device 102C and may have a length of DataLength3. Write command 754 and DATA3 756 may be issued from the MOSI port to the SDI port of electronic device 102A.

Next, MCU 101 may issue NOPs, or logic low output, to electronic device 102A until all of the commands have propagated to electronic devices 102. MCU 101 may then issue a changed edge, such as a rising edge, on the nCS signal. Respective electronic devices 102 may execute their received commands upon receipt of the command and data to be written or upon this changed edge on the nCS signal.

As shown in graph 308, electronic device 102A may write the sequence of commands and data (636, 746, 748, 750, 752, 754, 756) on its SDO port to the SDI port of electronic device 102B. Similarly, as shown in graph 310, electronic device 102B may write the sequence of commands and data (636, 746, 748, 750, 752, 754, 756) on its SDO port to the SDI port of electronic device 102C. Furthermore, as shown in graph 312, electronic device 102C may write the sequence of commands and data (636, 746, 748, 750, 752, 754, 756) on its SDO port to the MISO port of MCU 101. This write may serve as an acknowledgement to MCU 101 that the commands and data have successfully propagated through the daisy chain.

Electronic device 102A may recognize that command 746 is intended to be executed by electronic device 102A. Electronic device 102A may execute command 746 using DATA1 748. Electronic device 102B may recognize that command 750 is intended to be executed by electronic device 102B. Electronic device 102B may execute command 750 using DATA2 752. Electronic device 102C may recognize that command 754 is intended to be executed by electronic device 102C. Electronic device 102C may execute command 754 using DATA2 756.

Aside from being intended for execution by a particular electronic device 102, each of commands 746, 750, 754 may be a same or a different write command. Furthermore, data 748, 752, 756 may each be the same or different data, or the same or different lengths of data. Each electronic device 102 may recognize and calculate data lengths for each command in the same manner.

FIG. 8 illustrates execution of read commands within the context of complex commands, according to embodiments of the present disclosure.

Before the events shown, MCU 101 may place electronic devices 102 into a daisy chain mode. Electronic devices 102 may be placed into daisy chain mode using any suitable signals or commands.

Similar to FIGS. 6-7, in FIG. 8, MCU 101 may issue complex command 636 after issuing a changed edge, such as a falling edge, on the nCS signal. MCU 101 may wait until all associated commands have propagated through the daisy chain of electronic devices 102 before issuing another changed edge, such as a rising edge, on the nCS signal. While the nCS signal is logic low, the SCK clock may be providing continuous clock signals.

As shown in graph 306, after issuing complex command 636 to electronic device 102A from the MOSI port to the SDI port of electronic device 102A, MCU 101 may be configured to issue a read command 858. Moreover, MCU 101 may be configured to issue NOP bytes 870 of a sufficient length to accommodate any data generated as a result of executing read command 858. Such data may be eventually generated by electronic device 102A and referred to as DATA1 860. The combination of read command 858 and the space occupied by NOP bytes 870 or DATA1 860 may form an overall read command. This overall read command may be intended for execution by electronic device 102A and may have a length of DataLength1. This may be issued from the MOSI port to the SDI port of electronic device 102A.

Next, MCU 101 may be configured to issue another read command 862. Moreover, MCU 101 may be configured to issue NOP bytes 870 of a sufficient length to accommodate any data generated as a result of executing read command 862. Such data may be eventually generated by electronic device 102B and referred to as DATA2 864. The combination of read command 862 and the space occupied by NOP bytes 872 or DATA2 864 may form an overall read command. This overall read command may be intended for execution by electronic device 102B and may have a length of DataLength2. This may be issued from the MOSI port to the SDI port of electronic device 102A.

Next, MCU 101 may be configured to issue another read command 866. Moreover, MCU 101 may be configured to issue NOP bytes 874 of a sufficient length to accommodate any data generated as a result of executing read command 866. Such data may be eventually generated by electronic device 102C and referred to as DATA3 868. The combination of read command 866 and the space occupied by NOP bytes 874 or DATA3 868 may form an overall read command. This overall read command may be intended for execution by electronic device 102C and may have a length of DataLength3. This may be issued from the MOSI port to the SDI port of electronic device 102A.

Next, MCU 101 may issue NOPs, or logic low output, to electronic device 102A until all of the commands have propagated to electronic devices 102 and data has been returned to MCU 101. MCU 101 may then issue a changed edge, such as a rising edge, on the nCS signal. Respective electronic devices 102 may execute their received commands upon receipt of the command.

As shown in graph 308, electronic device 102A may write the sequence of complex command 636, read command 858, DATA1 860 generated by electronic device 102A, read command 862, NOPs 872, read command 866, and NOPs 874, 876 on its SDO port to the SDI port of electronic device 102B.

Similarly, as shown in graph 310, electronic device 102B may write the sequence of complex command 636, read command 858, DATA1 860, read command 862, DATA2 864 generated by electronic device 102B, read command 866, and NOPs 874, 876 on its SDO port to the SDI port of electronic device 102C.

Furthermore, as shown in graph 312, electronic device 102C may write the sequence of complex command 636, read command 858, DATA1 860, read command 862, DATA2 864, read command 866, DATA3 868 generated by electronic device 102C, and NOPs 876 (or at least as many NOPs 876 that can be written before a rising edge of the nCS signal) on its SDO port to the MISO port of MCU 101. This write may serve as an acknowledgement to MCU 101 that the commands and data have successfully propagated through the daisy chain, and as a mechanism by which the data read in electronic devices 102 may be provided to MCU 101.

Electronic device 102A may recognize that command 858 is intended to be executed by electronic device 102A. Electronic device 102A may execute command 858 to yield DATA1 860. Electronic device 102A may issue DATA1 860 rather than propagating NOPs 870. Electronic device 102B may recognize that command 862 is intended to be executed by electronic device 102B. Electronic device 102B may execute command 862 to yield DATA2 864. Electronic device 102B may issue DATA2 864 rather than propagating NOPs 872. Electronic device 102C may recognize that command 866 is intended to be executed by electronic device 102C. Electronic device 102A may execute command 866 to yield DATA3 868. Electronic device 102A may issue DATA3 868 rather than propagating NOPs 874.

Aside from being intended for execution by a particular electronic device 102, each of commands 858, 862, 866 may be a same or a different read command. Furthermore, data 860, 864, 868 may each be the same or different lengths of data. Each electronic device 102 may recognize and calculate data lengths for each command in the same manner.

FIG. 9 illustrates execution of a mixture of read, write, and fast commands within the context of complex commands, according to embodiments of the present disclosure.

Before the events shown, MCU 101 may place electronic devices 102 into a daisy chain mode. Electronic devices 102 may be placed into daisy chain mode using any suitable signals or commands.

Similar to FIGS. 6-8, in FIG. 9, MCU 101 may issue complex command 636 after issuing a changed edge, such as a falling edge, on the nCS signal. MCU 101 may wait until all associated commands have propagated through the daisy chain of electronic devices 102 before issuing another changed edge, such as a rising edge, on the nCS signal. While the nCS signal is logic low, the SCK clock may be providing continuous clock signals.

As shown in graph 306, after issuing complex command 636 to electronic device 102A from the MOSI port to the SDI port of electronic device 102A, MCU 101 may be configured to issue a read command 978. Moreover, MCU 101 may be configured to issue NOP bytes 982 of a sufficient length to accommodate any data generated as a result of executing read command 978. Such data may be eventually generated by electronic device 102A and referred to as DATA1 980. The combination of read command 978 and the space occupied by NOP bytes 982 or DATA1 980 may form an overall read command. This overall read command may be intended for execution by electronic device 102A and may have a length of DataLength1. This may be issued from the MOSI port to the SDI port of electronic device 102A.

Next, MCU 101 may be configured to issue a write command 984 and DATA2 986 to be written. The combination of write command 984 and DATA2 986 to be written may form an overall write command. This overall write command may be intended for execution by electronic device 102B and may have a length of DataLength2. Write command 984 and DATA2 986 may be issued from the MOSI port to the SDI port of electronic device 102A.

Next, MCU 101 may be configured to issue a fast command 988. Execution of fast command 988 might require no data to be generated by the intended recipient. In one embodiment, fast command 988 may be intended to be executed by electronic devices 102C. In another embodiment, fast command 988 may be intended to be executed by all of electronic devices 102. Fast command 988 may be DataLength3 bytes wide. Fast command 988 may be issued from the MOSI port to the SDI port of electronic device 102A.

Next, MCU 101 may issue NOPs 990, or logic low output, to electronic device 102A until all of the commands have propagated to electronic devices 102 and data has been returned to MCU 101. MCU 101 may then issue a changed edge, such as a rising edge, on the nCS signal. Respective electronic devices 102 may execute their received commands upon receipt of the command or upon the rising edge of the nCS signal.

As shown in graph 308, electronic device 102A may write the sequence of complex command 636, read command 978, DATA1 980 generated by electronic device 102A, write command 884, DATA2 986, fast command 988, and NOPs 990 on its SDO port to the SDI port of electronic device 102B.

Similarly, as shown in graph 310, electronic device 102B may write the sequence of complex command 636, read command 978, DATA1 980 generated by electronic device 102A, write command 884, DATA2 986, fast command 988, and NOPs 990 on its SDO port to the SDI port of electronic device 102C.

Furthermore, as shown in graph 312, electronic device 102C may write the sequence of complex command 636, read command 978, DATA1 980 generated by electronic device 102A, write command 884, DATA2 986, fast command 988, and NOPs 990 (or at least as many NOPs 990 that can be written before a rising edge of the nCS signal) on its SDO port to the MISO port of MCU 101. This write may serve as an acknowledgement to MCU 101 that the commands and data have successfully propagated through the daisy chain, and as a mechanism by which the data read in electronic devices 102 may be provided to MCU 101.

Electronic device 102A may recognize that command 978 is intended to be executed by electronic device 102A. Electronic device 102A may execute command 878 to yield DATA1 980. Electronic device 102A may issue DATA1 980 rather than propagating NOPs 982. Electronic device 102B may recognize that command 984 is intended to be executed by electronic device 102B. Electronic device 102B may execute command 984 using DATA2 986. In one embodiment, electronic device 102C may recognize that fast command 988 is intended to be executed by electronic device 102C, and it may be executed. The execution of commands 984, 988 may be delayed and triggered by the changed edge, such as the rising edge, of the nCS signal.

In each of FIGS. 7-9, data written to the MISO port of MCU 101 may serve as an acknowledgement. MCU 101, upon seeing the same commands or data written to electronic device 102A returning from the end of the daisy chain at electronic device 102C, may determine whether or not all the command and data were successfully executed and propagated. If the information received at MCU 101 does not match expected information, MCU 101 may take any suitable corrective action. For example, any commands not properly executed may be resent. A command for a single one of electronic devices 102 may be issued by MCU 101 by writing the command in the appropriate slot corresponding to the given electronic device 102, while issuing NOPs in the other slots.

Figure 10:
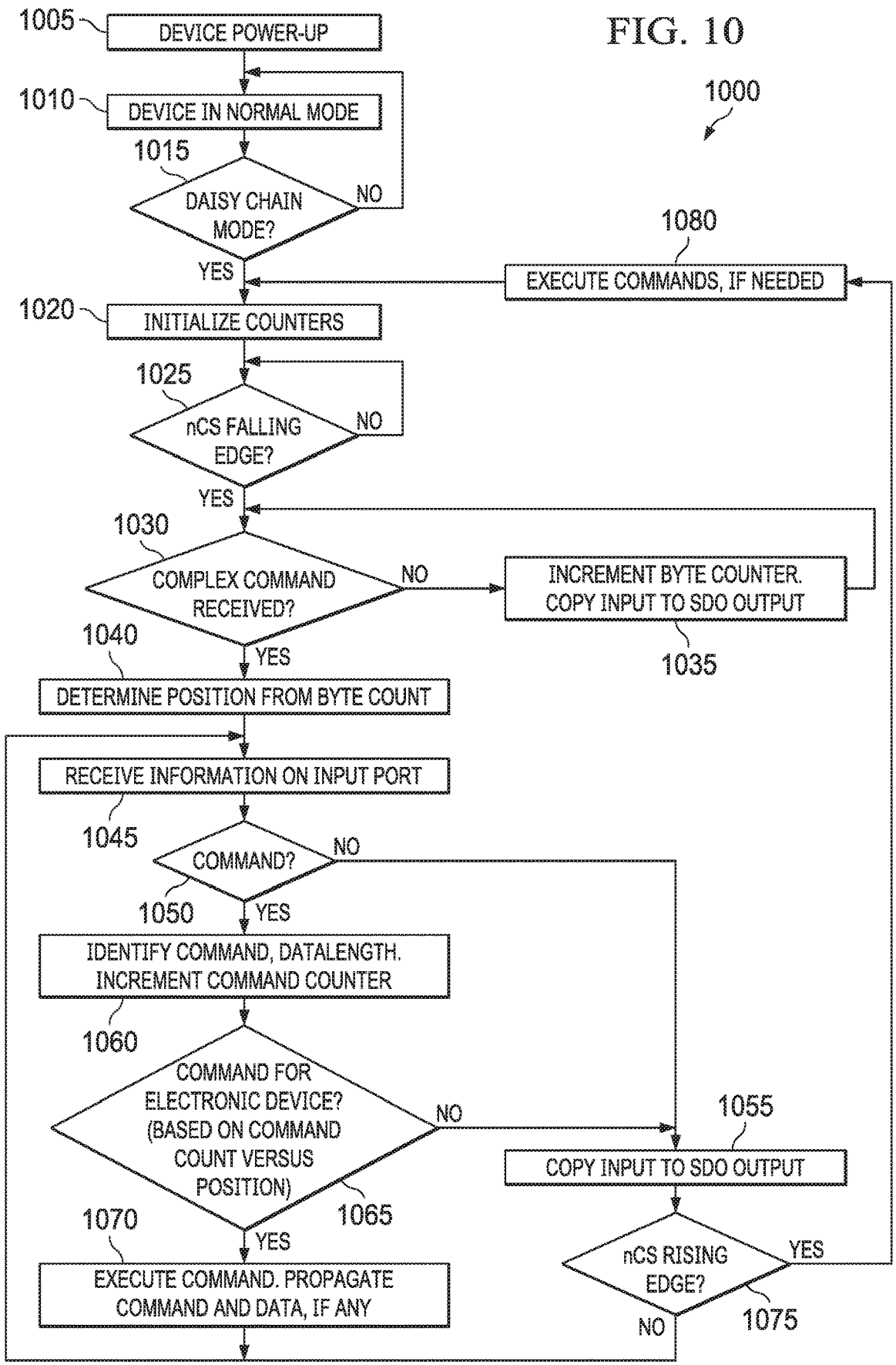
FIG. 10 is an illustration a method for execution of daisy chain complex commands, according to embodiments of the present disclosure.

FIG. 10 is an illustration a method 1000 for execution of daisy chain complex commands, according to embodiments of the present disclosure. In particular, method 1000 may illustrate operation electronic device 102. Method 1000 may be implemented within, for example, SPI interface circuit 204 Method 1000 may include fewer or more steps, may enter steps in a different order, repeat steps, or enter different step paths in parallel with respect to one another. Method 1000 may begin at any suitable step, such as step 1005.

At step 1005, the electronic device, such as electronic device 102, may power-up. After performing any necessary boot or start-up tasks, method 1000 may enter step 510. Step 1010 may reflect normal operation for electronic device 102, when electronic device 102 is not propagating its inputs to its outputs in a daisy chain manner, nor sending such data to be propagated in a daisy chain manner.

At step 1015, SPI interface circuit 204 may be configured to determine whether electronic device 102 is to enter daisy chain mode. SPI interface circuit 204 may make such a determination in any suitable manner. If so, method 1000 may proceed to step 1020. Otherwise, method 1000 may repeat step 1010 to operate in normal mode daisy chain mode.

At step 1020, counters, such as a byte counter and a command counter, may be initialized, if necessary. The byte counter may be configured to count bytes that have been received between a falling edge of the nCS signal and receipt of a complex command. This may be used to determine a position of the electronic device within the daisy chain. The command counter may be configured to count the number of commands that have issued after a complex command. This may be used to determine whether a given command is intended to be executed by the electronic device.

At step 1025, it may be determined whether a signal, such as a falling edge on an nCS signal, has been received from MCU 101. If not, method 1000 may repeat at step 1025. Otherwise, method 100 may proceed to step 1030.

At step 1030, it may be determined whether received information is a complex command. If so, method 1000 may proceed to step 1040. Otherwise, method 100 may proceed to step 1035.

At step 1035, the byte counter may be implemented. Input at the SDI port may be copied to the SDO port. Method 1000 may return to step 1030.

At step 1040, a position of the electronic device may be determined in any suitable manner. For example, position may be determined from the byte count. This may indicate the delay of the complex command from its issuance as it propagated through the daisy chain to reach the given electronic device. This may assume that the complex command is one byte long, and that MCU 101 issued the complex command immediately after issuing the falling edge on the nCS signal.

At step 1045, information may be received on the input port from further up the daisy chain.

At step 1050, it may be determined whether or not the received information is a command. If not, method 1000 may proceed to step 1055. Otherwise, method 1000 may proceed to step 1060.

At step 1055, input that has been received in step 1045 may be copied to the SDO port. Method 1000 may proceed to step 1075.

At step 1060, the command may be identified. An intended electronic device for the command may be determined. The nature of the command, whether write, read, or fast command, may be determined. A data length of the command may be determined, including any data to be executed with the command or generated from the command. The command counter may be incremented. Thus, electronic device may track the number of commands that have been received after the falling edge of the nCS signal.

At step 1065, it may be determined whether the command is intended for electronic device execute, rather than another electronic device to execute. This may be based on a comparison of the command count versus the position of the electronic device. If not, method 1000 may proceed to step 1055. Otherwise, method 1000 may proceed to step 1070.

At step 1070, the command may be executed, if appropriate. For example, a write command or a fast command might be executed in step 1070. Alternatively, these may instead have their execution delayed until a rising edge of the NCS signal is detected in, for example, step 1075. A read command, for example, might be executed in step 1070. The command along with any data generated from execution of the command may be propagated by copying the information to the SDO port. Method 1000 may return to step 1045.

At step 1075, it may be determined whether there is a changed edge, such as a rising edge, on the nCS signal. If not, method 1000 may return to step 1045. If so, method 1000 may proceed to step 1080.

At step 1080, the commands that have been received for execution by the electronic device may be executed, if necessary. Method 1000 may return to step 1022 continue executing a daisy chain mode.

Although not illustrated in FIG. 10, method 1000 may terminate at any suitable step. Moreover, method 1000 may exit daisy chain mode at any suitable step after step 1015, and return to step 1010 to operate a normal mode. In addition, method 1000 may exit the complex daisy chain execution and return to step 1020 for daisy chain mode execution at any suitable point after step 1030.

Figure 11:
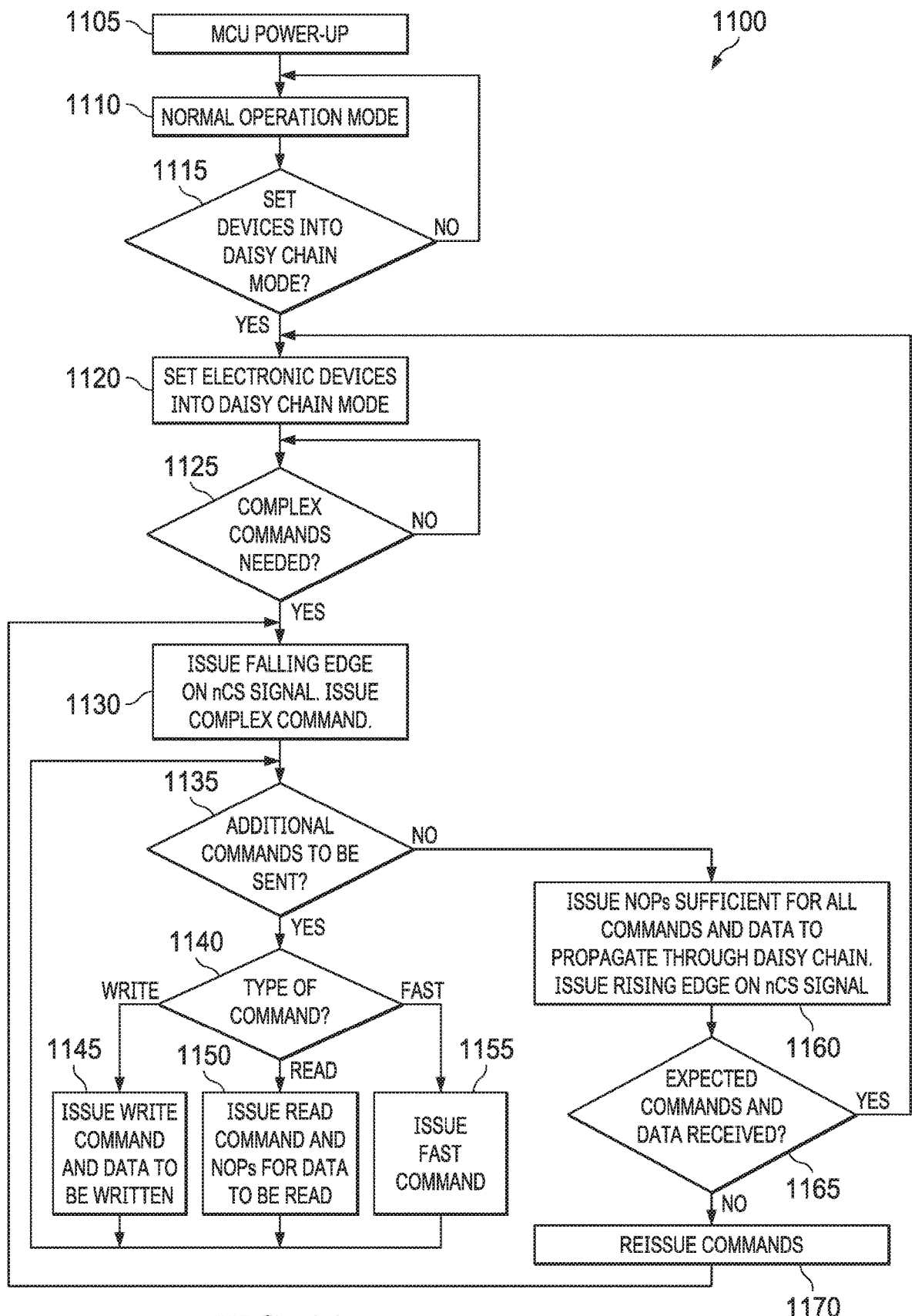
FIG. 11 is an illustration of operation of another method for execution of complex commands for a daisy chain mode, according to embodiments of the present disclosure.

FIG. 11 is an illustration of operation of another method 1100 for execution of complex commands for a daisy chain mode, according to embodiments of the present disclosure. In particular, method 1100 may illustrate operation of MCU 101. Method 1100 may be implemented within, for example, SPI interface circuit 202. Method 1100 may include fewer or more states, may enter states in a different order, repeat states, or enter different state paths in parallel with respect to one another. Method 1100 may be implemented by, for example, a state machine in SPI interface circuit 202. Method 1100 may begin at any suitable step, such as step 1105.

At step 1105, the MCU, such as MCU 101, may power-up. After performing any necessary boot or start-up tasks, method 1100 may enter step 1110. Step 1110 may reflect normal operation for MCU 101, when MCU 101 is not sending data to electronic devices 102 in a daisy chain manner, nor receiving such data propagated in a daisy chain manner.

At step 1115, an interface circuit of the MCU, such as SPI interface circuit 202, may be configured to determine whether to put electronic devices 102 into a daisy chain mode. If not, method 1100 may return to step 1110. Otherwise, method 1100 may proceed to step 1120. At step 1120, the MCU may place electronic devices in the daisy chain into a daisy chain mode. Step 1120 may be performed in any suitable manner.

At step 1125, an interface circuit of the MCU, such as SPI interface circuit 202, may be configured to determine whether to issue a complex command to electronic devices 102. This may be based upon, for example, a need to issue commands to be specifically executed by particular electronic devices 102. If so, method 1100 may proceed to step 1130. Otherwise, method 1100 may repeat at step 1125.

At step 1130, a signal, such as a falling edge on the nCS signal, may be issued to the electronic devices. Furthermore, a complex command may be issued to the first electronic device in the daisy chain.

At step 1135, it may be determined whether there are additional commands that are to be sent to the electronic devices. If so, method 1000 may proceed to step 1140. Otherwise, method 1000 may proceed to step 1160.

At step 1140, the type of command that is to be sent may be determined. If the type of command to be sent is a write command, method 1000 may proceed to step 1145. If the type of command to be sent is a read command, method 1000 may proceed to step 1150. If the type of command to be sent is a fast command, method 1000 may proceed to step 1155.

At step 1145, the write command may be issued to the first of the electronic devices in the daisy chain. Furthermore, any data that is to be used for execution by the write command, such as the data to be written, may be issued to the first of the electronic devices in the daisy chain. Method 1000 may proceed to step 1135.

At step 1150, the read command may be issued to the first of the electronic devices in the daisy chain. Furthermore, a quantity of NOPs sufficient to hold a place for data to be read by the read command may be issued to the first of the electronic devices in the daisy chain. Method 1000 may proceed to step 1135.

At step 1155, the fast command may be issued to the first of the electronic devices in the daisy chain. Method 1000 may proceed to step 1135.

At step 1160, additional NOPs may be issued to the first of electronic devices in the daisy chain. The quantity of these additional NOPs may be sufficient so that all commands, data, and NOPs issued in steps 1145, 1150, 1155 may propagate through all electronic devices in the daisy chain. Moreover, the quantity of these additional NOPs may be sufficient to that the MCU will receive copies of all commands and data issued in steps 1145, 1150, 1155, as well as any data generated by execution of such commands. A rising edge on the nCS signal may be issued.

At step 1165, it may be determined whether the commands and data received in step 1160 match the commands and data that are expected. If so, method 1000 may return to step 1120. Otherwise, method 1000 may proceed to step 1170.

At step 1170, any suitable corrective action may be taken. For example, any commands that were not received correctly in step 1165, or data from the execution thereof was not received correctly in step 1165, may be reissued. This may be performed through one or more instances of returning to step 1130 for reissuing a new stream of commands with the complex command.

Although not illustrated in FIG. 11, method 1100 may terminate at any suitable step. Moreover, method 1100 may exit daisy chain mode at any suitable step after step 1115, and return to step 1110 to operate a normal mode. In addition, method 1100 may exit the complex daisy chain execution and return to step 1020 for daisy chain mode execution at any suitable point after step 1030.

Although example embodiments have been described above, other variations and embodiments may be made from this disclosure without departing from the spirit and scope of these embodiments.

We claim:

1. An apparatus, comprising:
a serial data input port to receive input from a first electronic device in a daisy chain of electronic devices;
a serial data output port to send output to a second electronic device in the daisy chain of electronic devices;
a chip select input port to receive input from a third electronic device; and
an interface circuit to, in a daisy chain mode and based on a first received command:
receive information on the serial data input port;
determine whether the information includes a second received command to be selectively executed by the apparatus;
based on a determination that the information includes the second received command is to be selectively executed by the apparatus, execute the second received command upon a changed edge on the chip select input port, the changed edge subsequent to receiving the second received command.

2. The apparatus of claim 1, wherein the interface circuit is to, based on a determination that the information includes a second received command that is not to be selectively executed by the apparatus, copy the second received command to the serial data output port without executing the second received command.

3. The apparatus of claim 1, wherein the interface circuit is to determine whether the information includes a second received command to be selectively executed by the apparatus based at least in part upon a position of the apparatus in the daisy chain of electronic devices.

4. The apparatus of claim 1, wherein the interface circuit is to determine whether the information includes a second received command to be selectively executed by the apparatus based on whether the second received command is received in an order corresponding to a position of the apparatus in the daisy chain of electronic devices.

5. The apparatus of claim 1, wherein the interface circuit is to copy the second received command to the serial data output port after executing the second received command.

6. The apparatus of claim 1, wherein the interface circuit is to receive a changed edge on the chip select input port in conjunction with the first received command.

7. The apparatus of claim 1, wherein the interface circuit is to copy other information to the serial data output port, the other information received before the information including the second received command.

8. The apparatus of claim 1, wherein the interface circuit is to:
determine that the second command is a read command;
execute the second command to generate read data; and
substitute portions of the information with the read data and copy results from the substitution to the serial data output port.

9. An apparatus, comprising:
a serial data output port to send output data to a first electronic device;
a serial data input port to receive input data from a second electronic device;
a chip select output port to send output to a plurality of electronic devices, the plurality of electronic devices connected in a daisy chain and including the first and second electronic devices;
an interface circuit to:
determine that a given electronic device in the plurality of electronic devices connected in a daisy chain is to selectively execute a first command;
based on a determination that the given electronic device is to execute the first command, issue a complex command to the plurality of electronic devices connected in a daisy chain through the serial data output port; and
with the complex command, indicate to the plurality of electronic devices that additional commands are to be selectively executed.

10. The apparatus of claim 9, wherein the interface circuit is to:
subsequent to issuing the complex command, issue the first command to the plurality of electronic devices connected in a daisy chain through the serial data output port, the first command to be selectively executed by the given electronic device and not executed by one or more other electronic devices in the daisy chain.

11. The apparatus of claim 10, wherein the interface circuit is to issue additional information before or after the first command such that a position of the first command among such additional information corresponds to a position of the given electronic device in the daisy chain.

12. The apparatus of claim 11, wherein a position of the additional information before or after the first command corresponds to other electronic devices in the daisy chain.

13. The apparatus of claim 10, wherein the additional information before or after the first command includes second commands for other electronic devices in the daisy chain or NOPs.

14. The apparatus of claim 9, wherein:

the first command is a read operation; and the interface circuit is to issue a quantity of NOPs immediately after the first command, the quantity sufficient for the given electronic device to write data yielded from executing the read operation.

15. The apparatus of claim 9, wherein:

the first command is a read operation to be executed by the given electronic device; and the interface circuit is to issue a second command to the plurality of electronic devices connected in a daisy chain through the serial data output port, the second command a write operation, the second command to be executed by the second electronic device.

16. A method, comprising:

through a serial data input port, receiving input from a first electronic device in a daisy chain of electronic devices;

through a serial data output port, sending output to a second electronic device in the daisy chain of electronic devices;

through a chip select input port, receiving input from a third electronic device; and in a daisy chain mode and based on a first received command:

receiving information on the serial data input port;

determining whether the information includes a second received command to be selectively executed by the apparatus; and based on a determination that the information includes the second received command is to be selectively executed by the apparatus, executing the second received command upon a changed edge on the chip select input port, the changed edge subsequent to receiving the second received command.

17. The method of claim 16, comprising, based on a determination that the information includes a second received command that is not to be selectively executed by the apparatus, copying the second received command to the serial data output port without executing the second received command.

18. A method, comprising:

sending output data to a first electronic device through a serial data output port;

receiving input data from a second electronic device through a serial data input port;

through a chip select output port, sending output to a plurality of electronic devices, the plurality of electronic devices connected in a daisy chain and including the first and second electronic devices;

determining that a given electronic device in the plurality of electronic devices connected in a daisy chain is to selectively execute a first command;

based on a determination that the given electronic device is to execute the first command, issuing a complex command to the plurality of electronic devices connected in a daisy chain through the serial data output port; and with the complex command, indicating to the plurality of electronic devices that additional commands are to be selectively executed.

19. The method of claim 18, comprising:

subsequent to issuing the complex command, issuing the first command to the plurality of electronic devices connected in a daisy chain through the serial data output port, the first command to be selectively executed by the given electronic device and not executed by one or more other electronic devices in the daisy chain.

\* \* \* \* \*